(12) United States Patent
Futenma et al.

(10) Patent No.: US 8,155,035 B2
(45) Date of Patent: Apr. 10, 2012

(54) RECEPTION APPARATUS AND METHOD, PROGRAM, AND RECORDING MEDIUM

(75) Inventors: Satoshi Futenma, Tokyo (JP); Kenji Yamane, Tokyo (JP)

(73) Assignee: Sony Corporation, Tokyo (JP)

( * ) Notice: Subject to any disclaimer, the term of this patent is extended or adjusted under 35 U.S.C. 154(b) by 1219 days.

(21) Appl. No.: 11/024,421

(22) Filed: Dec. 30, 2004

(65) Prior Publication Data

US 2005/0169199 A1 Aug. 4, 2005

(30) Foreign Application Priority Data

Jan. 8, 2004 (JP) ................................ 2004-002646

(51) Int. Cl.
*H04B 1/44* (2006.01)
(52) U.S. Cl. .................................. 370/282; 370/395.21
(58) Field of Classification Search .................. 370/282, 370/395.21
See application file for complete search history.

(56) References Cited

U.S. PATENT DOCUMENTS

| | | | | |
|---|---|---|---|---|
| 6,665,313 B1* | 12/2003 | Chang et al. | ................... | 370/469 |
| 7,180,896 B1* | 2/2007 | Okumura | ....................... | 370/394 |
| 2001/0047474 A1* | 11/2001 | Takagi et al. | ................. | 713/151 |
| 2002/0038441 A1* | 3/2002 | Eguchi et al. | ................. | 714/748 |
| 2002/0154600 A1* | 10/2002 | Ido et al. | ........................ | 370/216 |
| 2003/0022629 A1* | 1/2003 | Miyoshi et al. | ............... | 455/67.3 |
| 2003/0086403 A1* | 5/2003 | Harris et al. | ................... | 370/338 |
| 2003/0126238 A1* | 7/2003 | Kohno et al. | .................. | 709/220 |
| 2004/0120348 A1* | 6/2004 | Chang et al. | ................... | 370/474 |
| 2004/0125815 A1* | 7/2004 | Shimazu et al. | .............. | 370/411 |
| 2005/0169199 A1* | 8/2005 | Futenma et al. | ............... | 370/282 |
| 2005/0254420 A1* | 11/2005 | Wager et al. | ................... | 370/230 |
| 2008/0205308 A1* | 8/2008 | Prehofer et al. | .............. | 370/310 |

FOREIGN PATENT DOCUMENTS

| | | |
|---|---|---|
| JP | 2003-060699 | 2/2003 |
| JP | 2003-169040 | 6/2003 |
| JP | 2003 179580 | 6/2003 |

* cited by examiner

*Primary Examiner* — Jianye Wu
(74) *Attorney, Agent, or Firm* — Oblon, Spivak, McClelland, Maier & Neustadt, L.L.P.

(57) ABSTRACT

A reception apparatus and method is disclosed wherein recovery of a lost packet can be performed simply and rapidly in response to the variation of the loss rate. A packet analysis section detects loss of a packet, and a retransmission processing section registers packet information including a sequence number for identification of a packet having been lost into a NACK list. When loss of a packet is detected by the packet analysis section, a NACK production section produces a NACK packet for requesting for retransmission of the non-arriving packet whose packet information is registered in the NACK list. A network inputting/outputting section transmits the NACK packet to a transmission apparatus. The invention can be applied to a reception apparatus which receives, for example, streaming data.

10 Claims, 16 Drawing Sheets

| SEQUENCE NUMBER | REPRODUCTION TIME (TIMESTAMP) |
|---|---|
| 2 | 3003 |
| 5 | 9009 |

| SEQUENCE NUMBER | REPRODUCTION TIME | COUNT VALUE |
|---|---|---|
| 2 | 3003 | 1 |
| 5 | 9009 | 0 |

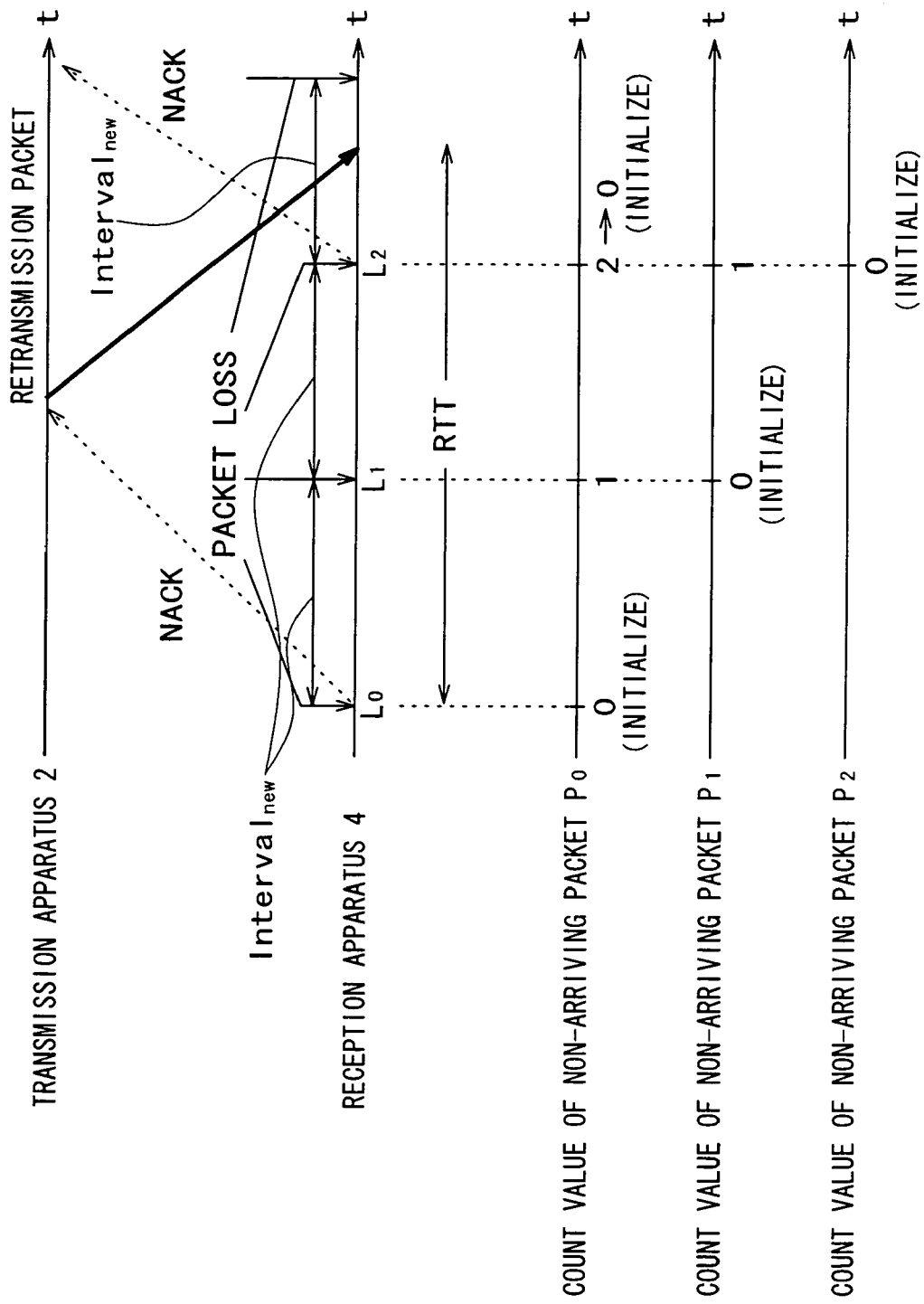

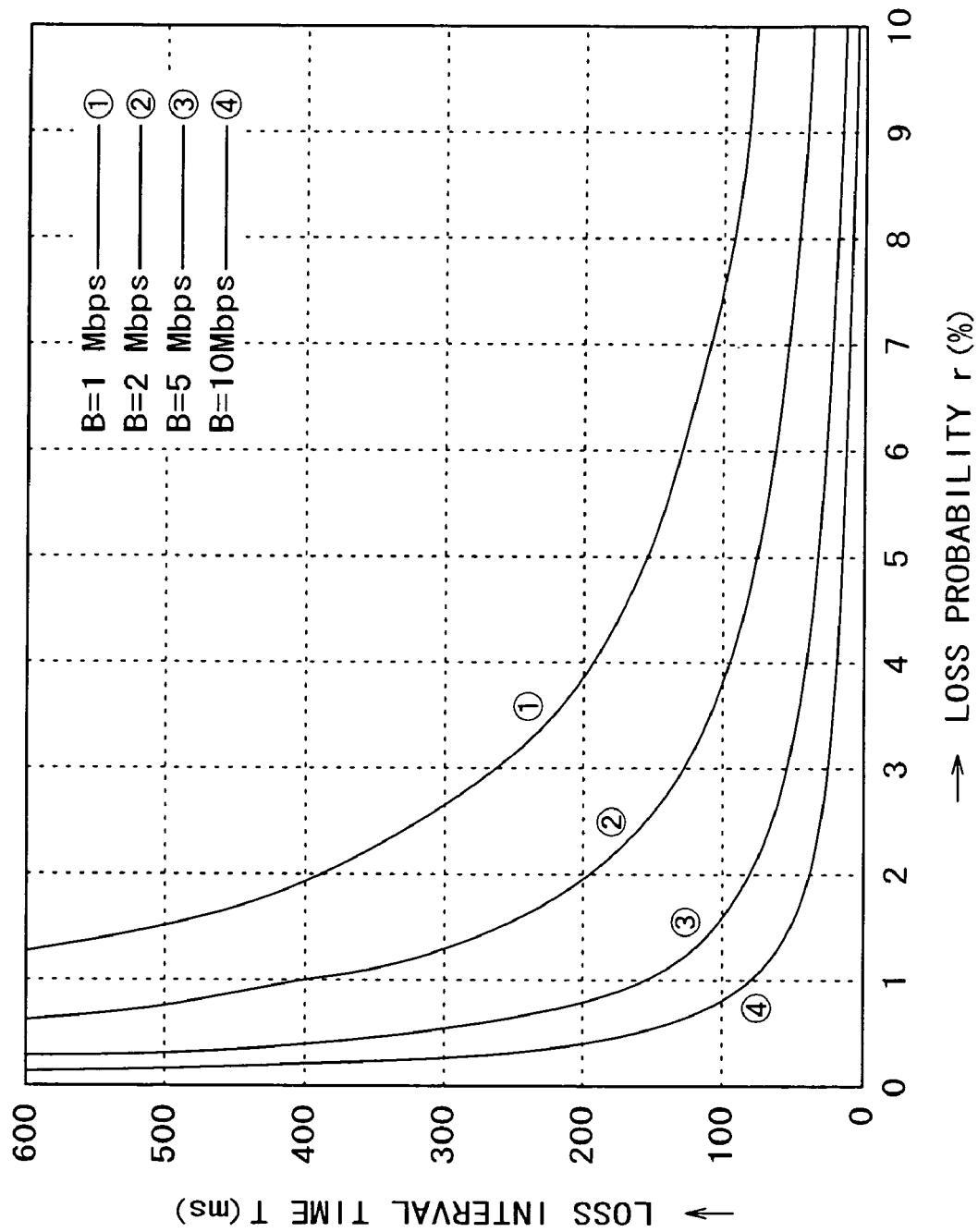

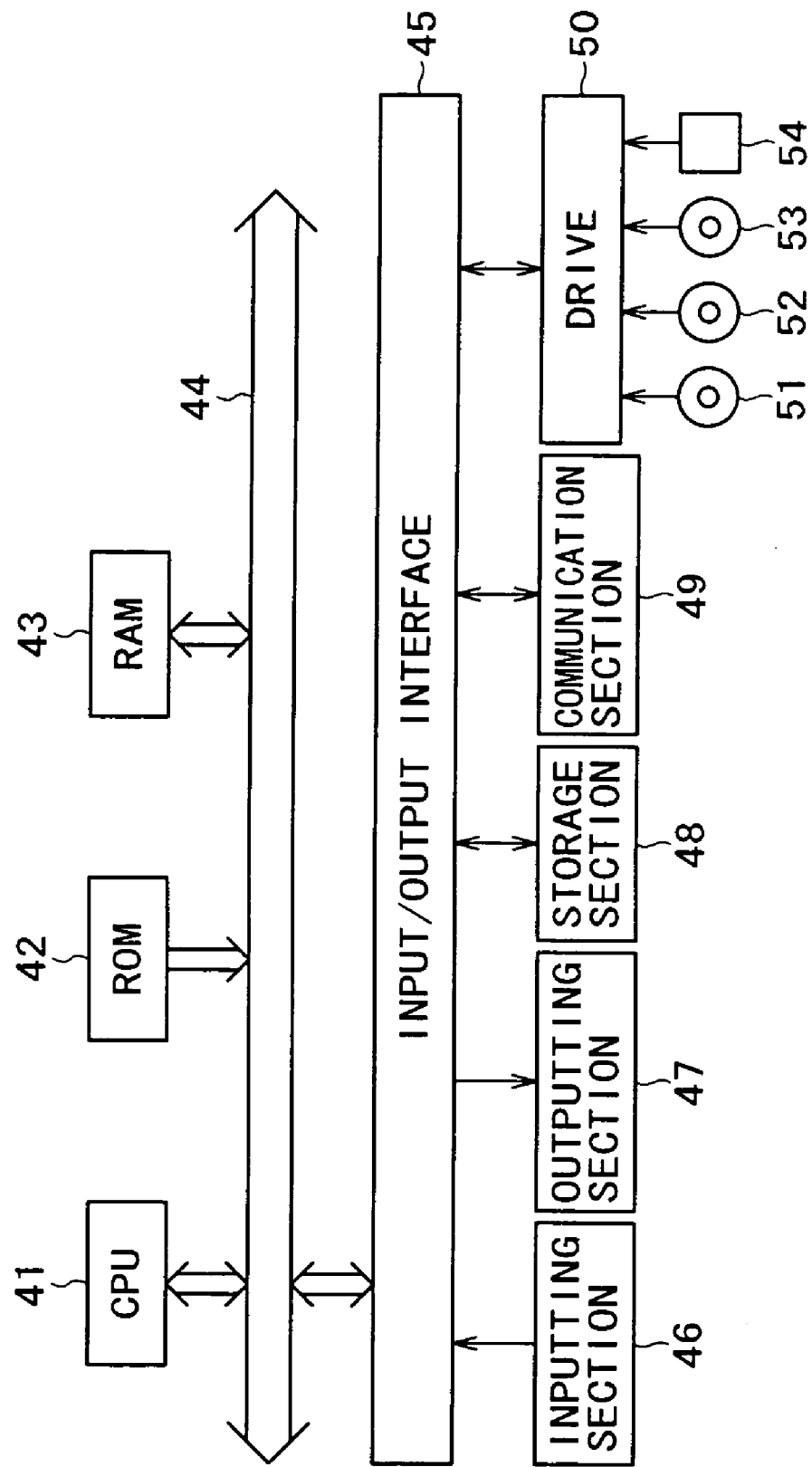

RECEPTION APPARATUS AND METHOD, PROGRAM, AND RECORDING MEDIUM

BACKGROUND OF THE INVENTION

This invention relates to a reception apparatus and method, a program and a recording medium, and more particularly to a reception apparatus and method, a program and a recording medium wherein a loss packet can be recovered simply and rapidly in response to a variation of the loss rate.

Real time communication which is performed through the Internet typically uses the UDP (User Datagram Protocol).

However, the UDP is a protocol which does not secure the reliability in that, even if data is lost or damaged on the Internet, the data cannot be recovered. For example, packet loss that a transmitted packet does not arrive at its destination sometimes occurs on the Internet. In particular, packet loss possibly occurs at a rate of 1% to 3% on the average and 10% at the highest from among all transmitted packets.

Accordingly, real time communication which is performed on the Internet using the UDP requires a mechanism for recovering a loss packet.

However, when a retransmission request is issued regarding a loss packet lost on the Internet, there is no security that a retransmission packet retransmitted in response to the retransmission request arrives without fail, but there is the possibility that the retransmission packet may be lost again.

Even if a retransmission packet is lost, the streaming quality can be enhanced by repetitively performing retransmission regarding the loss packet within a period of time within which the real time property is assured. In other words, in order to enhance the streaming quality, it is necessary to detect loss of a packet including a retransmission packet and repetitively issue a retransmission request for the non-arriving packet.

A related-art system which performs retransmission control taking the real time property into consideration is disclosed, for example, in Japanese Patent Laid-Open No. Hei 7-221789 (hereinafter referred to as Patent Document 1), Japanese Patent Laid-Open No. Hei 9-191314 (hereinafter referred to as Patent Document 2) or Japanese Patent Laid-Open No. 2002-84338 (hereinafter referred to as Patent Document 3). The system is based on the concept that the packet loss rate can be suppressed to a sufficiently low value even if the loss of retransmission packets is not taken into consideration. This is because, even if the packet loss rate is 10%, if a retransmission request is issued once, then the apparent loss rate drops to 1%.

However, since the amount by which the actual loss rate can be recovered varies, in order to secure that the apparent loss rate falls within a fixed range, it is necessary to satisfy, as a restriction to the network, the condition that the actual loss rate must remain within a range determined in advance. Further, the systems disclosed in Patent Document 1, Patent Document 2 and Patent Document 3 do not include any countermeasure against the loss of a retransmission packet.

Meanwhile, Japanese Patent Laid-Open No. 2001-119437 (hereinafter referred to as Patent Document 4) discloses a data transmission method wherein the sender side embeds information regarding the number of times by which retransmission has been performed into a succeeding packet so that the receiver side detects packet loss of retransmission packets and repetitively issues a retransmission request. However, according to the method of Patent Document 4, it is necessary for the sender side to retain information regarding the number of times of retransmission, and this considerably complicates a process of analyzing the packet format and packets.

Further, according to the method of Patent Document 4, information regarding the number of times of retransmission is always added to a packet irrespective of the loss rate. Therefore, the method of Patent Document 4 has a problem also that the overhead in processing of on the sender side or the receiver side is high.

Japanese Patent Laid-Open No. 2003-169040 (hereinafter referred to as Patent Document 5) discloses a system wherein, at a moment at which a packet is lost, a first retransmission request is issued and, after a periodical interval of time, a non-arriving packet is checked. Thus, even where a retransmission packet is lost, a retransmission request is issued repetitively. The system of Patent Document 5 is simpler in configuration than that of the method of Patent Document 4. However, in the system of Patent Document 5, since second and succeeding retransmission requests are not issued before retransmission time comes, where packet loss occurs frequently, if the timer value for counting the time till the retransmission time is not set to a suitable value, then retransmission request for a lost packet is not performed appropriately. On the other hand, if the timer value is excessively low, a retransmission request is issued frequently although the loss rate is low.

Patent Document 5 discloses a solution to the problem when the timer value is excessively low. According to the solution, within a period of round-trip time (RTT) after time at which a NACK (Negative ACKnowledge) packet, which is a retransmission requesting packet for requesting for retransmission, is transmitted, the same NACK packet is not transmitted again. In order to implement the solution, it is necessary to retain the transmission time with regard to all NACK packets. Further, it is necessary to determine, upon checking of a non-arriving packet, whether or not the non-arriving packet arrives in time before the reproduction time and further to determine whether not a NACK packet corresponding to the non-arriving packet has been transmitted within the RTT time in the past. This makes processing of a receiver terminal complicated.

A possible other method for repetitively performing retransmission request is that an interval of time after a retransmission request is issued from the receiver side and a retransmission packet arrives at the receiver side is estimated and, when it is detected that the retransmission packet does not arrive before estimated time of arrival, a retransmission request is issued again. However, according to the method described, it is necessary to perform control based on a timer for detecting whether or not a retransmission packet arrives at every estimated time of arrival. Generally, where an apparatus which performs a reception process as a software program is incorporated, such control based on a timer as described above applies a very high load. Accordingly, where a retransmission request is issued frequently, most part of the capacity of a CPU (Central Processing Unit) is used for a timer process which is a process regarding the time with regard to all of such retransmission requests. This stagnates a reception process of a packet or a display process of data transmitted in the form of a packet, resulting in deterioration of the reproduction quality of the data.

Thus, with existing techniques including the techniques disclosed in Patent Documents 1 to 5, it is difficult to adaptively reduce the load to a reception apparatus in response to a variation of the loss rate and enhance the retransmission performance.

SUMMARY OF THE INVENTION

It is an object of the present invention to provide a reception apparatus and method, a program and a recording medium wherein recovery of a lost packet can be performed adaptively in response to the loss rate of packets.

According to an aspect of the present invention, there is provided a reception apparatus for receiving packets successively transmitted from a transmission apparatus, comprising a detection section for detecting loss of a packet, a registration section for registering packet information including identification information for identification of the packet with which the loss occurs into a retransmission request list, a retransmission requesting packet production section for producing, when loss of a packet is detected by the detection section, a retransmission requesting packet for requesting for retransmission of the non-arriving packet whose packet information is registered in the retransmission request list, and a retransmission requesting packet transmission section for transmitting the retransmission requesting packet to the transmission apparatus.

According to another aspect of the present invention, there is provided a reception method for receiving packets successively transmitted from a transmission apparatus, comprising a detection step of detecting loss of a packet, a registration step of registering packet information including identification information for identification of the packet with which the loss occurs into a retransmission request list, a retransmission requesting packet production step of producing, when loss of a packet is detected by the detection step, a retransmission requesting packet for requesting for retransmission of the non-arriving packet whose packet information is registered in the retransmission request list, and a retransmission requesting packet transmission step of transmitting the retransmission requesting packet to the transmission apparatus.

According to a further aspect of the present invention, there is provided a program for allowing a computer to execute a reception process for receiving packets successively transmitted from a transmission apparatus, comprising a detection step of detecting loss of a packet, a registration step of registering packet information including identification information for identification of the packet with which the loss occurs into a retransmission request list, a retransmission requesting packet production step of producing, when loss of a packet is detected by the detection step, a retransmission requesting packet for requesting for retransmission of the non-arriving packet whose packet information is registered in the retransmission request list, and a retransmission requesting packet transmission step of transmitting the retransmission requesting packet to the transmission apparatus.

According to a still further aspect of the present invention, there is provided a recording medium on which a computer-readable program for allowing a computer to execute a reception process for receiving packets successively transmitted from a transmission apparatus is recorded, the program comprising a detection step of detecting loss of a packet, a registration step of registering packet information including identification information for identification of the packet with which the loss occurs into a retransmission request list, a retransmission requesting packet production step of producing, when loss of a packet is detected by the detection step, a retransmission requesting packet for requesting for retransmission of the non-arriving packet whose packet information is registered in the retransmission request list, and a retransmission requesting packet transmission step of transmitting the retransmission requesting packet to the transmission apparatus.

In the reception apparatus and method, program and recording medium, loss of a packet is detected, and packet information including identification information for identification of the packet with which loss has occurred is registered into the retransmission request list. Then, when loss of a packet is detected, a retransmission requesting packet for requesting for retransmission of the non-arriving packet whose packet information is registered in the retransmission request list is produced and transmitted to the transmission apparatus.

With the reception apparatus and method, program and recording medium, recovery of packet loss can be performed adaptively in response to the loss rate.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 21 is a diagrammatic view illustrating a variation of a count value and a retransmission request where the upper limit value to the count value is 2;

FIG. 22 is a diagrammatic view illustrating a relationship between the loss rate and the loss interval; and FIG. 23 is a block diagram showing an example of a hardware configuration of a computer which executes a program to which the present invention is applied.

DETAILED DESCRIPTION OF THE PREFERRED EMBODIMENTS

Figure 1:
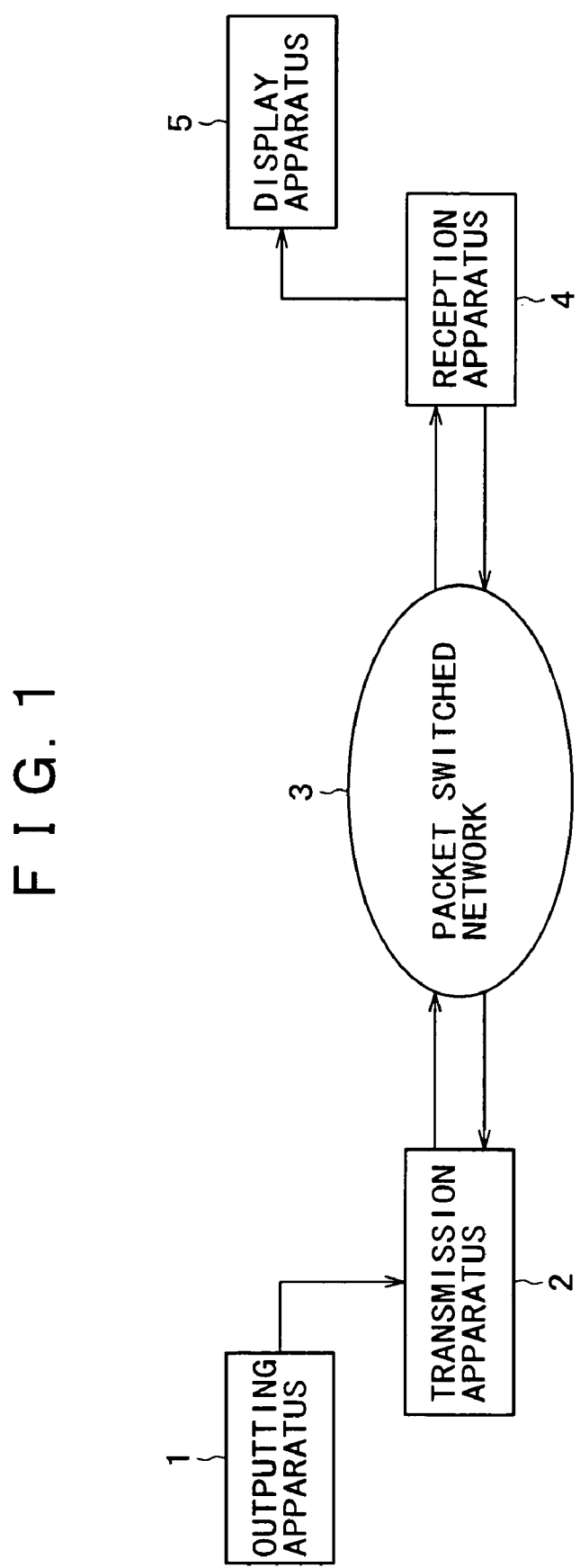
FIG. 1 is a block diagram showing an example of a configuration of a communication system to which the present invention is applied.

Before the best mode for carrying out the present invention is described in detail, a corresponding relationship between several features recited in the accompanying claims and particular elements of the preferred embodiments described below is described. It is to be noted, however, that, even if some mode for carrying out the invention which is recited in the specification is not described in the description of the corresponding relationship below, this does not signify that the mode for carrying out the invention is out of the scope or spirit of the present invention. On the contrary, even if some mode for carrying out the invention is described as being within the scope or spirit of the present invention in the description of the corresponding relationship below, this does not signify that the mode is not within the spirit or scope of some other invention than the present invention.

Further, the following description does not signify all of the invention disclosed in the present specification. In other words, the following description does not deny the presence of an invention which is disclosed in the specification but is not recited in the claims of the present application, that is, the description does not deny the presence of an invention which may be filed for patent in a divisional patent application or may be additionally included into the present patent application as a result of later amendment.

According to the present invention, a reception apparatus is provided. The reception apparatus (for example, a reception apparatus 4 of FIG. 4) receives packets successively transmitted from a transmission apparatus, and includes a detection section (for example, a packet analysis section 22 shown in FIG. 4) for detecting loss of a packet. The reception apparatus may further include a registration section (for example, a retransmission processing section 26 shown in FIG. 4) for registering packet information including identification information for identification of the packet with which the loss occurs into a retransmission request list (for example, a NACK list 27 shown in FIG. 4). The reception apparatus may further include a retransmission requesting packet production section (for example, a NACK production section 28 shown in FIG. 4) for producing, when loss of a packet is detected by the detection section, a retransmission requesting packet for requesting for retransmission of the non-arriving packet whose packet information is registered in the retransmission request list. The reception apparatus may further include a retransmission requesting packet transmission section (for example, a network inputting/outputting section 21 shown in FIG. 4) for transmitting the retransmission requesting packet to the transmission apparatus.

The reception apparatus may further include a round-trip time measurement section (for example, an RTT measurement section 25 shown in FIG. 4) for measuring round-trip time which is an interval of time after a retransmission requesting packet is transmitted to the transmission apparatus (for example, a transmission apparatus 2 of FIG. 2) until a retransmission packet corresponding to the packet whose retransmission is requested by the retransmission requesting packet arrives from the transmission apparatus at the reception apparatus. The reception apparatus may further include a reproduction discrimination section (for example, a processing step S61 of a program of FIG. 13) for comparing a reproduction allowance time period which is a period of time of allowance before reproduction of the non-arriving packet is to be performed and the round-trip time with each other to discriminate whether or not the retransmission packet corresponding to the non-arriving packet arrives in time prior to the reproduction time of the retransmission packet. The reception apparatus may further include a deletion section (for example, a processing step S62 of the program of FIG. 13) for deleting the packet information of the non-arriving packet which does not arrive in time prior to the reproduction time from the retransmission request list.

Figure 4:
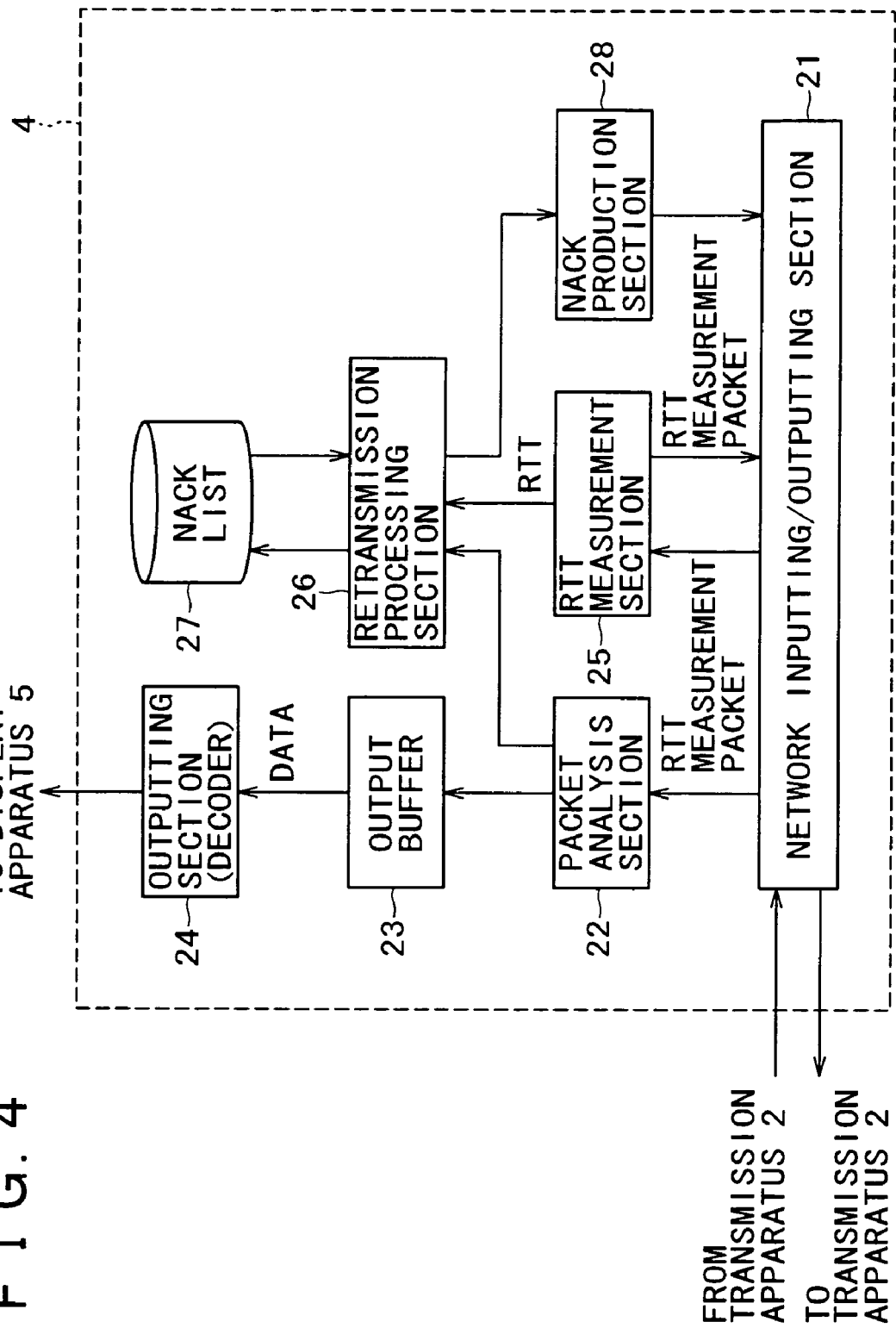
FIG. 4 is a block diagram showing an example of a configuration of a reception apparatus shown in FIG. 1.

The reception apparatus may further include a retransmission packet reception section (for example, the network inputting/outputting section 21 shown in FIG. 4) for receiving a retransmission packet transmitted from the transmission apparatus and corresponding to the packet whose retransmission is requested by the retransmission requesting packet. The reception apparatus may further include a deletion section (for example, a processing step S23 of a program of FIG. 9) for deleting the packet information of the non-arriving packet corresponding to the retransmission packet received by the retransmission packet reception section from the retransmission request list (for example, the NACK list 27 shown in FIG. 4).

Preferably, the retransmission requesting packet production section (for example, the NACK production section 28 shown in FIG. 4) produces the retransmission requesting packet for all of the non-arriving packets whose packet information is registered in the retransmission request list (for example, the NACK list 27 shown in FIG. 4).

The reception apparatus may further include a loss interval calculation section (for example, loss interval measurement section 29 shown in FIG. 14) for calculating a loss interval which is an interval of time between times at which loss of a packet occurs, and a setting section (for example, a processing step S73 of a program of FIG. 16) for setting the threshold value based on the calculated loss interval.

Figure 14:
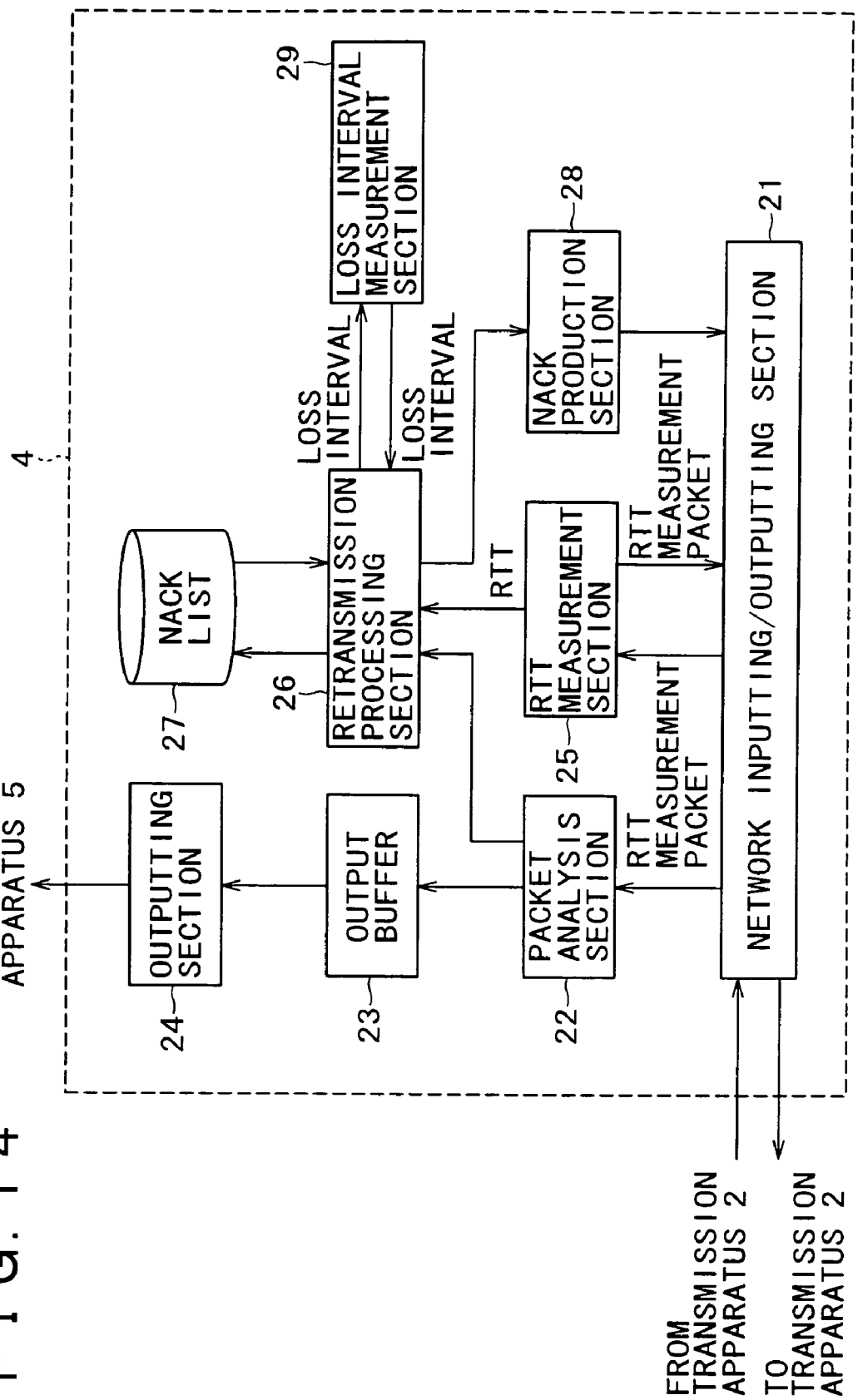
FIG. 14 is a block diagram showing another example of a configuration of the reception apparatus shown in FIG. 1.

The reception apparatus may further include a round-trip time measurement section (for example, an RTT measurement section 25 shown in FIG. 14) for measuring round-trip time which is an interval of time after a retransmission requesting packet is transmitted to the transmission apparatus until a retransmission packet corresponding to the packet whose retransmission is requested by the retransmission requesting packet arrives from the transmission apparatus at the reception apparatus, and a setting section (for example, a retransmission processing section 26 shown in FIG. 14) for setting the threshold value based on the measured round-trip time.

The reception apparatus may further include a resetting section (for example, a processing step S113 of a program of FIG. 20) for resetting the count regarding the non-arriving packet whose retransmission is requested by the retransmission requesting packet.

According to the present invention, a reception method is provided. The reception method (for example, a packet reception process of FIG. 9) is a method for receiving packets successively transmitted from a transmission apparatus and includes a detection step (for example, a processing step S24 of a program of FIG. 9) of detecting loss of a packet. The reception method may further include a registration step (for example, a processing step S43 of a program of FIG. 11) of registering packet information including identification information for identification of the packet with which the loss occurs into a retransmission request list. The reception method may further include a retransmission requesting packet production step (for example, a processing step S63 of a program of FIG. 13) of producing, when loss of a packet is detected by the detection step, a retransmission requesting packet for requesting for retransmission of the non-arriving packet whose packet information is registered in the retransmission request list. The reception method may further include a retransmission requesting packet transmission step (for example, a processing step S33 of a program of FIG. 10) of transmitting the retransmission requesting packet to the transmission apparatus.

According to the present invention, a program is provided. The program (for example, the packet reception process of FIG. 9) is a program for allowing a computer to execute a reception process for receiving packets successively transmitted from a transmission apparatus and includes a detection step (for example, the processing step S24 of the program of FIG. 9) of detecting loss of a packet. The reception method may further include a registration step (for example, the processing step S43 of the program of FIG. 11) of registering packet information including identification information for identification of the packet with which the loss occurs into a retransmission request list. The reception method may further include a retransmission requesting packet production step (for example, the processing step S63 of the program of FIG. 13) of producing, when loss of a packet is detected by the detection step, a retransmission requesting packet for requesting for retransmission of the non-arriving packet whose packet information is registered in the retransmission request list. The reception method may further include a retransmission requesting packet transmission step (for example, the processing step S33 of the program of FIG. 10) of transmitting the retransmission requesting packet to the transmission apparatus.

The program can be recorded on a recording medium.

In the following, embodiments of the present invention are described.

FIG. 1 shows an example of a configuration of a communication system to which the present invention is applied.

The communication system of FIG. 1 includes an outputting apparatus 1, a transmission apparatus 2, a packet switched network 3, a reception apparatus 4 and a display apparatus 5.

The outputting apparatus 1 typically picks up an image and supplies image data obtained from the picked up image to the transmission apparatus 2.

The transmission apparatus 2 stores the image data supplied thereto from the outputting apparatus 1 into packets of a predetermined system to produce the packets and transmits the packets in accordance with a streaming system to the reception apparatus 4 through the packet switched network 3. Further, the transmission apparatus 2 receives a NACK packet transmitted thereto from the reception apparatus 4 through the packet switched network 3 and transmits a packet whose retransmission is requested by the NACK packet as a retransmission packet to the reception apparatus 4 through the packet switched network 3.

The packet switched network 3 is a transmission line formed, for example, from the Internet. It is to be noted that the packet switched network 3 need not necessarily be the Internet but any network only if it can transmit a packet of a format hereinafter described.

The reception apparatus 4 receives a packet transmitted thereto from the transmission apparatus 2 through the packet switched network 3 and supplies image data placed in the packet to the display apparatus 5 so as to be displayed on the display apparatus 5. Further, the reception apparatus 4 detects loss of a packet and a NACK packet for requesting for retransmission of the lost packet to the transmission apparatus 2 through the packet switched network 3.

The display apparatus 5 displays image data supplied thereto from the reception apparatus 4.

It is to be noted that, for the outputting apparatus 1, for example, a video camera, a digital still camera, a VHS (Video Home System) deck, a DVD (Digital Versatile Disc) player, a satellite tuner or a CATV (CAble TeleVision) set top box which can output continuous media data (data continuous in time) in accordance with the NTSC (National Television Standards Committee) system.

Figure 2:
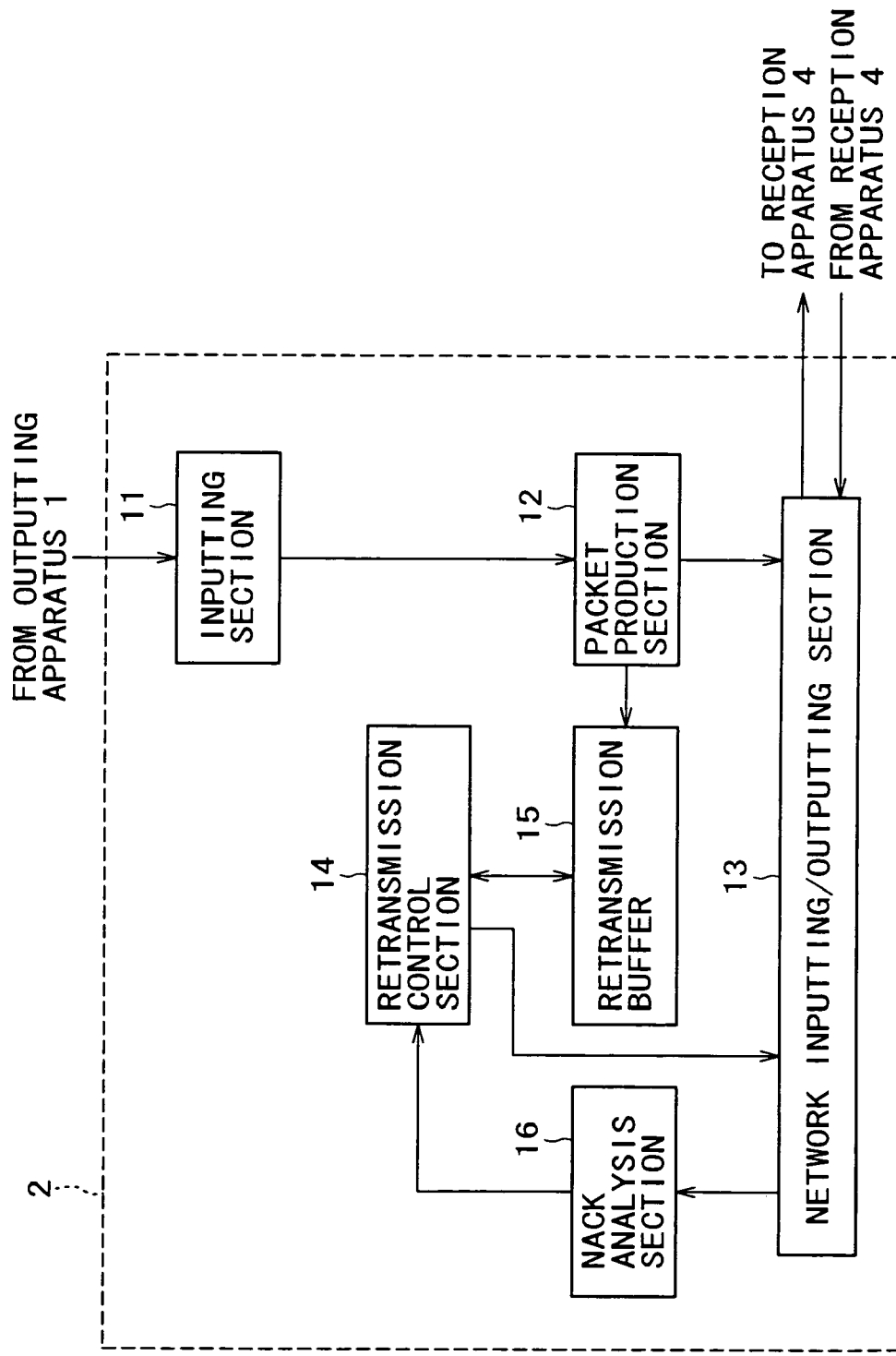
FIG. 2 is a block diagram showing an example of a configuration of a transmission apparatus shown in FIG. 1.

FIG. 2 shows an example of a configuration of the transmission apparatus 2 of FIG. 1.

Referring to FIG. 2, the transmission apparatus 2 shown includes an inputting section 11, a packet production section 12, a network inputting/outputting section 13, a retransmission control section 14, a retransmission buffer 15 and a NACK analysis section 16.

The inputting section 11 fetches image data supplied thereto from the outputting apparatus 1, performs a predetermined process such as, for example, compression for the image data and supplies resulting image data to the packet production section 12. It is to be noted that, where the outputting apparatus 1 is of the type which outputs compressed image data of a DV (Digital Video) camera or the like, the inputting section 11 performs some other predetermined process than compression for the image data and supplies resulting image data to the packet production section 12.

The packet production section 12 produces a packet in which the image data supplied thereto from the inputting section 11 are placed and which is suitable for network transmission, and supplies the packet to the network inputting/outputting section 13 and the retransmission buffer 15.

Here, the format of a packet produced by the packet production section 12 is described with reference to FIG. 3.

Figure 3:
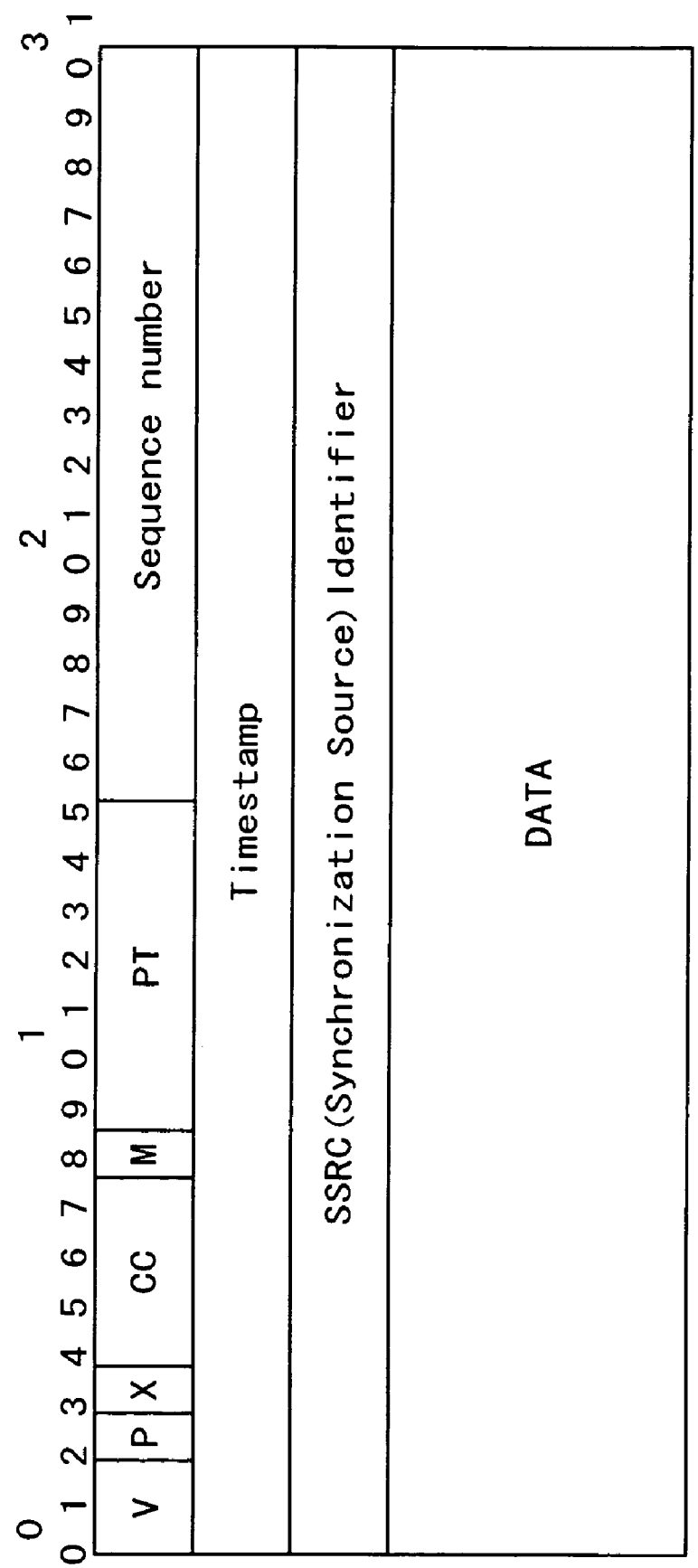
FIG. 3 is a view illustrating a format of a packet produced by a packet production section shown in FIG. 2.

The packet format illustrated in FIG. 3 is that for an RTP (Real-time Transport Protocol) packet prescribed by the RFC (Request For Comments) 3550 ("RTP: A Transport Protocol for Real-time Applications", July 2003) issued by the IETF (The Internet Engineering Task Force) and is suitable for distribution of real time data.

At the top of the packet, version information of 2 bits represented by "V" in FIG. 3 is placed. The version information represents the version of the packet.

A padding of 1 bit represented by "P" in FIG. 3 is placed next to the version information and is followed by extension information of 1 bit. The extension information is represented by "X" in FIG. 3. The extension information is set to a predetermined value where an extension header is placed in the packet.

A CSRC (Contributing Source) count is placed next to the extension information in the packet. The CSRC count is represented by "CC" in FIG. 3. The CSRC count represents the number of CSRC identifiers.

Maker information of 1 bit placed next to the CSRC count is defined by a profile. The maker information is represented by "M" in FIG. 3.

A payload type of 7 bits disposed next to the maker information is information for defining a format of the packet. The payload type is represented by "PT" in FIG. 3.

A sequence number (Sequence number) is information of 16 bits placed next to the payload type. The sequence number is a number representative of an order number of reproduction of the packet and is incremented by one for every transmission. The sequence number is used to detect packet loss and repair the sequential order of packets.

A timestamp (Timestamp) of 32 bits placed next to the sequence number is information representative of the time at which the first octet of streaming data placed in the packet is sampled.

An SSRC (Synchronization Source) identifier (Identifier) is information of 32 bits placed next to the time stamp and represents the source of streaming data placed in the packet.

In the packet, streaming data are placed next to the SSRC identifier. In FIG. 3, "DATA" represents the steaming data.

Referring back to FIG. 2, a packet is supplied from the packet production section 12 to the network inputting/outputting section 13, and also a retransmission packet is supplied from the retransmission control section 14 to the network inputting/outputting section 13. The network inputting/outputting section 13 transmits the packet from the packet production section 12 and the retransmission packet from the retransmission control section 14 to the reception apparatus 4 through the packet switched network 3. Further, the network inputting/outputting section 13 receives a NACK packet or an RTT measurement packet hereinafter described transmitted thereto from the reception apparatus 4 through the packet switched network 3. The network inputting/outputting section 13 supplies the received NACK packet to the NACK analysis section 16. The network inputting/outputting section 13 transmits the received RTT measurement packet to the reception apparatus 4 through the packet switched network 3.

To the retransmission control section 14, a sequence number as identification information of a packet whose retransmission is requested by a NACK packet from the NACK analysis section 16 is supplied. The retransmission control section 14 reads out a packet of the sequence number supplied thereto from the NACK analysis section 16 from the retransmission buffer 15. The retransmission control section 14 supplies the packet read out from the retransmission buffer 15 to the network inputting/outputting section 13 so that the packet is transmitted as a retransmission packet from the network inputting/outputting section 13 to the reception apparatus 4 through the packet switched network 3.

The retransmission buffer 15 stores the packet supplied thereto from the packet production section 12 in preparation for possible later retransmission of the same.

The NACK analysis section 16 analyzes a NACK packet supplied thereto from the network inputting/outputting section 13 to recognize a sequence number of a packet whose retransmission is requested by the NACK packet and supplies the sequence number to the retransmission control section 14.

FIG. 4 shows an example of a configuration of the reception apparatus 4 shown FIG. 1.

Referring to FIG. 4, the reception apparatus 4 includes a network inputting/outputting section 21, a packet analysis section 22, an output buffer 23, an outputting section 24, an RTT measurement section 25, a retransmission processing section 26, a NACK list 27 and a NACK production section 28.

The transmission apparatus 2 receives a packet including a retransmission packet transmitted thereto from the transmission apparatus 2 through the packet switched network 3 and supplies the received packet to the packet analysis section 22. Further, the network inputting/outputting section 21 transmits an RTT measurement packet supplied thereto from the RTT measurement section 25 to the transmission apparatus 2 through the packet switched network 3. The network inputting/outputting section 21 receives an RTT measurement packet transmitted thereto from the transmission apparatus 2 through the packet switched network 3 in response to the transmission of the RTT measurement packet and supplies the received RTT measurement packet to the RTT measurement section 25. Furthermore, the network inputting/outputting section 21 transmits a NACK packet supplied thereto from the NACK production section 28 to the transmission apparatus 2 through the packet switched network 3.

The packet analysis section 22 supplies a packet supplied thereto from the network inputting/outputting section 21 to the output buffer 23 so as to be stored into the output buffer 23. Further, the packet analysis section 22 analyzes a current packet supplied thereto from the network inputting/outputting section 21 to discriminate whether or not the current packet is a retransmission packet and performs detection of loss of a packet. If the packet analysis section 22 discriminates that the current packet is a retransmission packet, then it supplies the sequence number of the retransmission packet to the retransmission processing section 26.

Furthermore, if the packet analysis section 22 detects loss of a packet, then it calculates a sequence number and a timestamp of the packet which has been lost and supplies them to the retransmission processing section 26.

The output buffer 23 temporarily stores a packet supplied thereto from the packet analysis section 22.

The outputting section 24 extracts image data from a packet stored in the output buffer 23 and supplies the image data to the display apparatus 5 so as to be displayed on the display apparatus 5. If the image data extracted from the packet is in a compressed form, then the outputting section 24 decompresses (decodes) the image data in accordance with a decompression system corresponding to the compression system of the compression and supplies the decompressed (decoded) image data to the display apparatus 5 so as to be displayed on the display apparatus 5.

It is to be noted that image data of an image (frame) is usually placed divisionally into a plurality of packets. In this instance, the outputting section 24 performs a process of reading out packets having timestamps indicating the same time from the output buffer 23 and re-constructing the image data of the one image.

A retransmission packet may possibly arrive but later than reproduction time of image data of one image which is formed including data placed in the retransmission packet. In this instance, the image data of the image suffers from missing of data, and the outputting section 24 performs also a masking operation for compensating for the missing.

The RTT measurement section 25 produces an RTT measurement packet periodically or non-periodically and supplies the RTT measurement packet to the network inputting/outputting section 21 so as to be transmitted from the network inputting/outputting section 21. It is to be noted that the time of transmission is placed into the RTT measurement packet.

Further, the RTT measurement section 25 receives an RTT measurement packet which has been received by the network inputting/outputting section 21 and supplied to the RTT measurement section 25 from the network inputting/outputting section 21. Then, the RTT measurement section 25 calculates a round-trip time RTT from the time of reception of the RTT measurement packet and the time of transmission placed in the RTT measurement packet and supplies the round-trip time RTT to the retransmission processing section 26. Here, the round-trip time RTT can be regarded as a period of time after the reception apparatus 4 transmits the NACK packet until a retransmission packet corresponding to a packet whose retransmission is requested by the NACK packet is transmitted to the reception apparatus 4 from the transmission apparatus 2.

The retransmission processing section 26 supplies a sequence number of a non-arriving packet, which has not arrived, registered in the NACK list 27 to the NACK production section 28 so that the NACK production section 28 may produce a NACK packet for requesting for retransmission of the packet identified with the sequence number.

Further, the retransmission processing section 26 additionally registers a sequence number and a timestamp of a packet, which has been lost, supplied thereto from the packet analysis section 22 as packet information relating to the packet into a new entry of the NACK list 27.

Furthermore, if a sequence number of a retransmission packet is received from the packet analysis section 22, then the retransmission processing section 26 deletes an entry, in which packet information including the sequence number is registered, from the NACK list 27. Accordingly, it is considered that packet information of non-arriving packets which have not yet arrived at the reception apparatus 4 is registered in the NACK list 27.

Further, the retransmission processing section 26 calculates a reproduction allowance time interval which is an allowance interval of time at the present time acquired from a clock section not shown before reproduction of a non-arriving packet whose packet information is registered in the NACK list 27 is performed. Then, the retransmission processing section 26 compares the reproduction allowance time interval and the round-trip time RTT supplied thereto from the RTT measurement section 25 with each other to discriminate whether or not a retransmission packet corresponding to the non-arriving packet arrives before the reproduction time. Then, if the retransmission packet corresponding to the non-arriving packet does not arrive before the reproduction time, then the entry in which the packet information of the non-arriving packet is registered is deleted from the NACK list 27.

The NACK list 27 stores an entry of packet information of a non-arriving packet under the control of the retransmission processing section 26.

Here, an entry of the NACK list 27 is described with reference to FIG. 5.

Figures 5, 6:
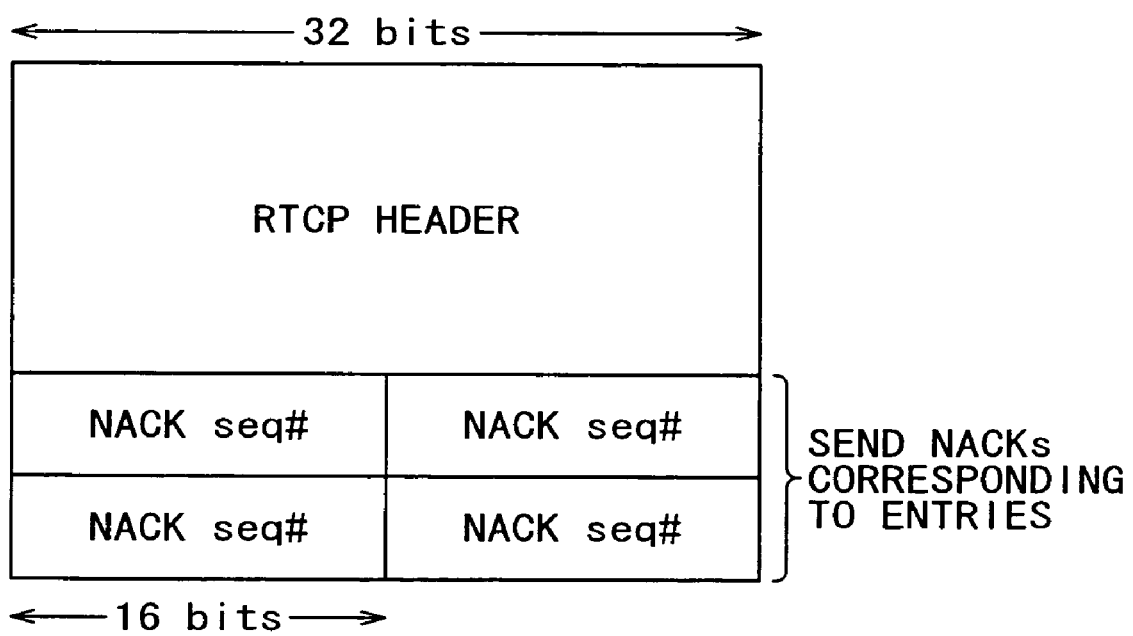
FIG. 5 is a view illustrating entries of a NACK list shown in FIG. 4.
FIG. 6 is a view illustrating a format of a NACK packet produced by a NACK production section shown in FIG. 4.

The NACK list 27 illustrated in FIG. 5 includes two entries. An entry is produced for each one non-arriving packet, and in each entry, the sequence number and the reproduction time (timestamp) of the non-arriving packet are registered as packet information of the non-arriving packet. In the NACK list 27 illustrated in FIG. 5, the sequence numbers of non-arriving packets are registered on the left side while the reproduction times of the non-arriving packets are registered on the right side. In FIG. 5, a non-arriving packet whose sequence number is 2 and whose reproduction time is 3003 and another non-arriving packet whose sequence number is 5 and whose reproduction time is 9009 are registered.

Referring back to FIG. 4, the NACK production section 28 produces a NACK packet for requesting for retransmission of a packet of a sequence number supplied thereto from the retransmission processing section 26 and supplies the produced NACK packet to the network inputting/outputting section 21 so that the NACK packet may be transmitted from the network inputting/outputting section 21 to the transmission apparatus 2 through the packet switched network 3.

Now, a format of a NACK packet produced by the NACK production section 28 is described with reference to FIG. 6.

The NACK packet illustrated in FIG. 6 is an RTCP (RTP Control Protocol) packet of the RTCP which is a protocol for controlling a session of an RTP and has an RTCP header of 32 bits.

Next to the RTCP header, sequence numbers successively supplied from the retransmission processing section 26 are successively described in 16 bits. In the NACK packet format of FIG. 6, a plurality of sequence numbers are described. Where a plurality of sequence numbers are described in one NACK packet in this manner, it is possible to reduce the overhead in processing of the reception apparatus 4 and allow efficient processing. It is to be noted that also it is possible to describe one sequence number in one NACK packet.

Figure 7:
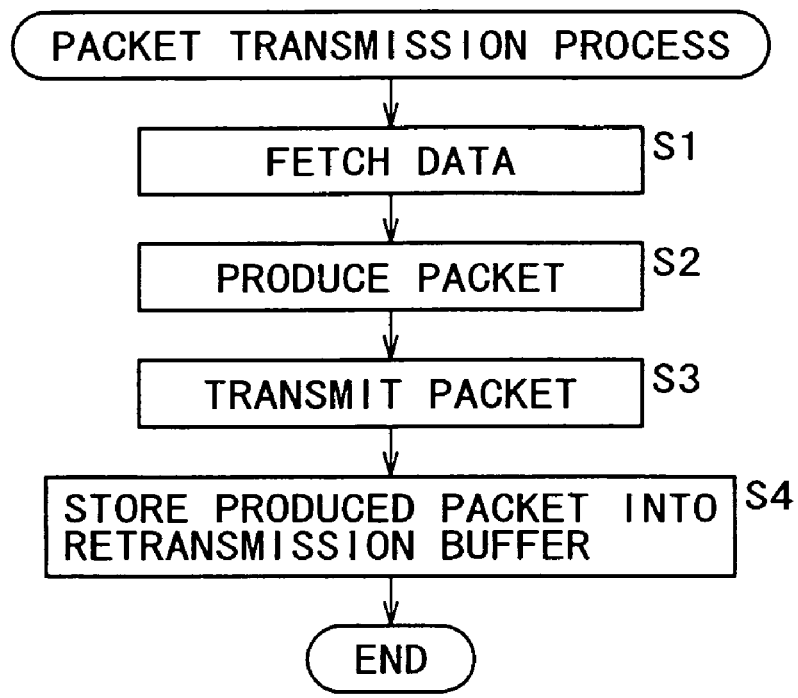
FIG. 7 is a flow chart illustrating a packet transmission process of the transmission apparatus.

FIG. 7 illustrates a packet transmission process of the transmission apparatus 2 of FIG. 2. The packet transmission process of FIG. 7 is started when image data is supplied from the outputting apparatus 1 to the transmission apparatus 2.

Referring to FIG. 7, first at step S1, the inputting section 11 fetches image data supplied thereto from the outputting apparatus 1, performs predetermined processes such as compression for the fetched image data and supplies resulting image data to the packet production section 12.

At step S2, the packet production section 12 produces a packet (RTP packet) of the format of FIG. 3 wherein the image data supplied from the inputting section 11 are placed in the payload and supplies the packet to the network inputting/outputting section 13.

At step S3, the network inputting/outputting section 13 transmits the packet supplied thereto from the packet production section 12 to the reception apparatus 4 through the packet switched network 3.

At step S4, the packet production section 12 supplies the packet produced at step S2 to the retransmission buffer 15 so as to be stored into the retransmission buffer 15. Then, the processing of the transmission apparatus 2 is ended.

Figure 8:
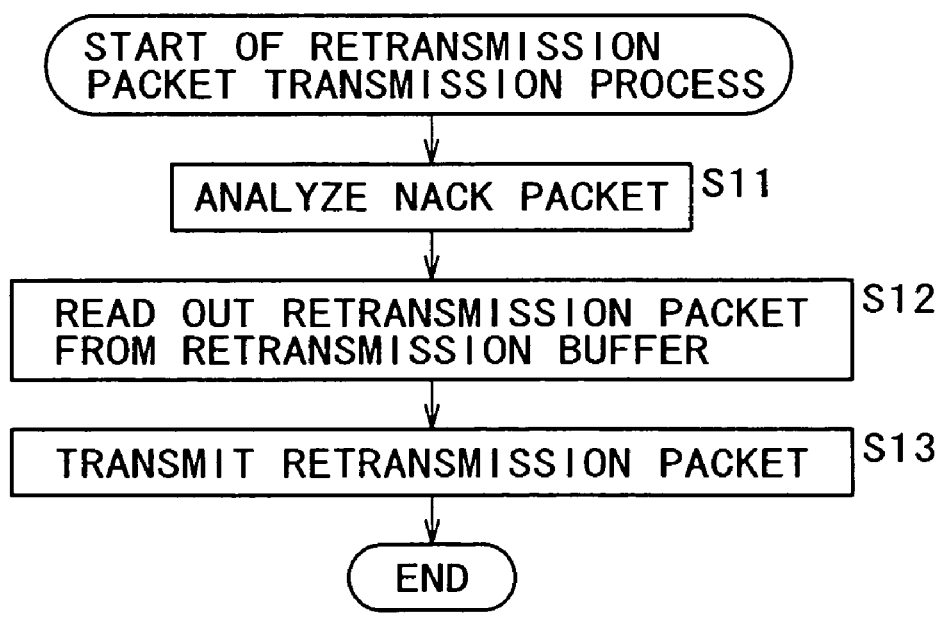
FIG. 8 is a flow chart illustrating a retransmission packet transmission process of the transmission apparatus.

FIG. 8 illustrates a retransmission packet transmission process of the transmission apparatus 2 of FIG. 2. The retransmission packet transmission process of FIG. 8 is started when a NACK packet transmitted from the reception apparatus 4 through the packet switched network 3 is received by the network inputting/outputting section 13 and supplied to the NACK analysis section 16.

Referring to FIG. 8, first at step S11, the NACK analysis section 16 analyzes a NACK packet from the network inputting/outputting section 13 to acquire the sequence number of a packet whose retransmission is requested and supplies the acquired sequence number to the retransmission control section 14.

At step S12, the retransmission control section 14 reads a packet of a sequence number same as the sequence number supplied thereto from the NACK analysis section 16 from the retransmission buffer 15 and supplies the read out packet to the network inputting/outputting section 13.

At step S13, the network inputting/outputting section 13 transmits the packet supplied thereto from the retransmission control section 14 as a retransmission packet to the reception apparatus 4 through the packet switched network 3. Then, the processing of the transmission apparatus 2 is ended.

Figure 9:
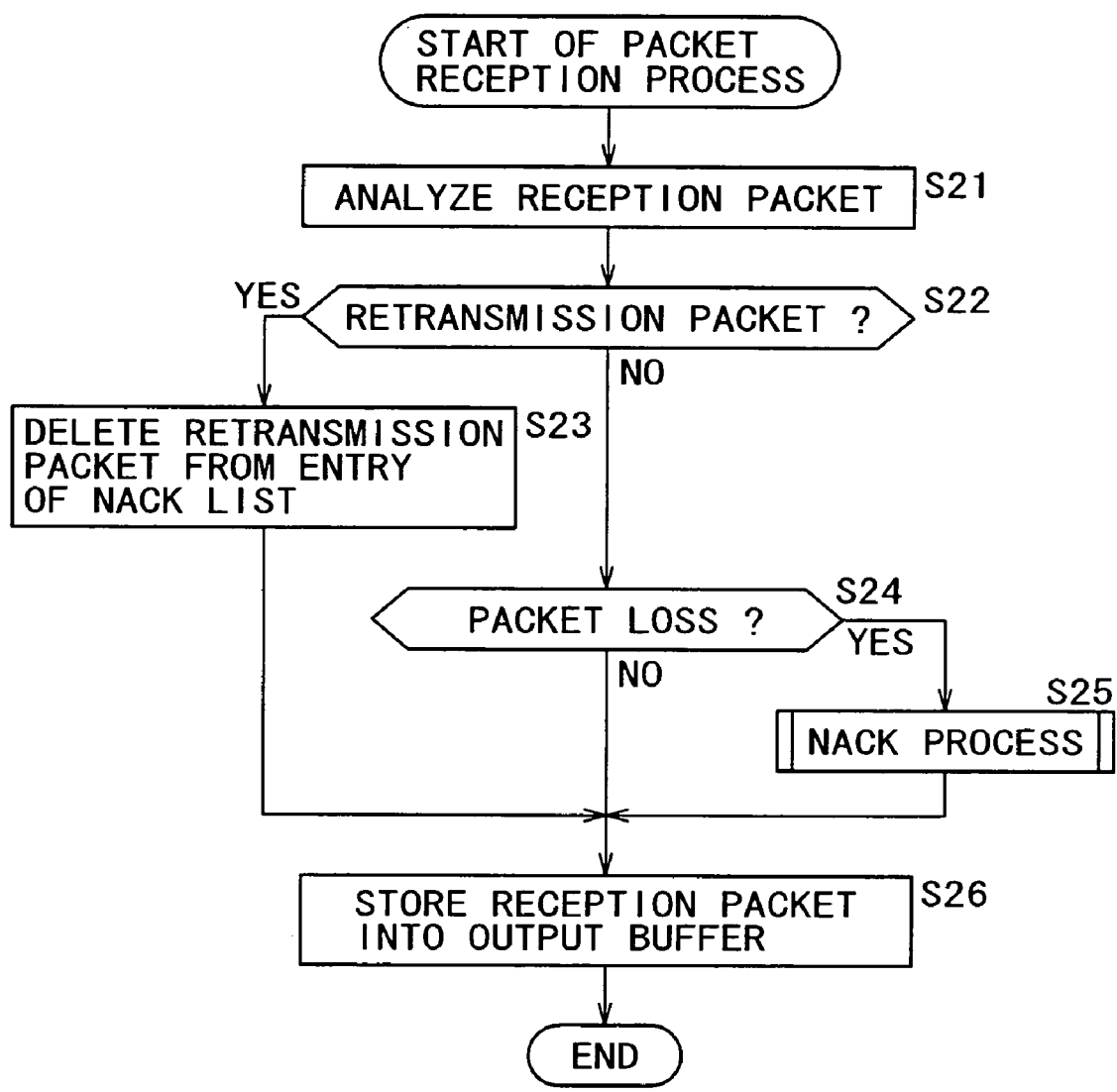
FIG. 9 is a flow chart illustrating a packet reception process of the reception apparatus.

FIG. 9 illustrates a packet reception process of the reception apparatus 4. The packet reception process of FIG. 9 is started when a packet transmitted from the transmission apparatus 2 through the packet switched network 3 is received by the network inputting/outputting section 21 and supplied to the packet analysis section 22.

Referring to FIG. 9, first at step S21, the packet analysis section 22 analyzes a current packet supplied from the network inputting/outputting section 21 to extract the sequence number of the packet.

At step S22, the packet analysis section 22 discriminates, based on the sequence number extracted from the current packet, whether or not the current packet is a retransmission packet.

If it is discriminated at step S22 that the current packet is not a retransmission packet, then the processing advances to step S24. At step S24, the packet analysis section 22 discriminates, based on the sequence number extracted from the current packet, whether or not packet loss has occurred.

It is to be noted that the packet analysis section 22 stores a maximum sequence number which is a maximum value among sequence numbers of packets received till now. Thus, the discrimination at step S22 of whether or not the current packet is a retransmission packet and the discrimination at step S24 of whether or not packet loss has occurred are performed through comparison of the sequence number of the current packet number and the maximum sequence number from among the packets received till now. In particular, the discriminations at step S22 and at step S24 are performed in accordance with an algorithm indicated as the RFC 3550 Appendix A.1 update_seq( ).

More particularly, if the sequence number of the current packet is greater by 1 than the maximum sequence number, then the packet analysis section 22 discriminates that the current packet is a packet (normal packet) transmitted as a result of the packet transmission process of FIG. 7 performed by the transmission apparatus 2.

However, if the sequence number of the current packet is greater by more than 1 (greater by 2 or more) than the maximum sequence number, then the packet analysis section 22 discriminates that packet loss has occurred with a packet which should have been transmitted prior to the current packet.

On the other hand, if the sequence number of the current packet is smaller than the maximum sequence number, then the packet analysis section 22 discriminates that the current packet is a retransmission packet.

When it is discriminated at step S24 that packet loss has occurred, that is, when the current packet is an ordinary packet and the sequence number of the current packet is greater by 2 or more than the maximum sequence number, then the packet analysis section 22 supplies the current packet, which is an ordinary packet, to the output buffer 23. The packet analysis section 22 calculates the sequence number and the timestamp of the packet with which the packet loss has occurred and supplies the calculated sequence number and timestamp to the retransmission processing section 26. Thereafter, the processing advances from step S24 to step S25.

At step S25, the retransmission processing section 26 performs a NACK process hereinafter described using the sequence number and the timestamp of the packet, with which the packet loss has occurred, received from the packet analysis section 22. Thereafter, the processing advances to step S26.

However, if it is discriminated at step S24 that no packet loss has occurred, that is, if the current packet is an ordinary packet whose sequence number is greater by one than the maximum sequence number, then the packet analysis section 22 supplies the current packet to the output buffer 23. Thereafter, the processing advances to step S26.

On the other hand, if it is discriminated at step S22 that the current packet is a retransmission packet, then the packet analysis section 22 supplies the sequence number of the retransmission packet to the retransmission processing section 26. Further, the packet analysis section 22 supplies the retransmission packet which is the current packet to the output buffer 23. Thereafter, the processing advances from step S22 to step S23.

At step S23, the retransmission processing section 26 searches the NACK list 27 for an entry in which packet information having a sequence number same as the sequence number of the retransmission packet supplied thereto from the packet analysis section 22 is registered, and erases the entry from the NACK list 27. However, if the NACK list 27 does not include an entry in which a sequence number same as the sequence number of the retransmission packet is described, then the retransmission processing section 26 performs no processing. Then, the processing advances from step S23 to step S26.

At step S26, the output buffer 23 stores the packet (ordinary packet or retransmission packet) supplied thereto from the packet analysis section 22. Then, the processing is ended.

Figure 10:
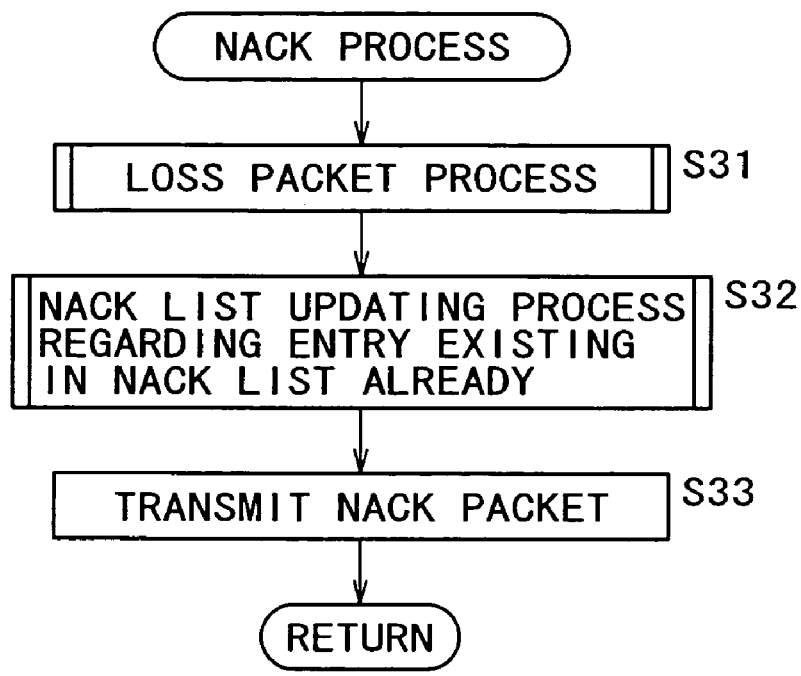
FIG. 10 is a flow chart illustrating a NACK process at step S25 of FIG. 9.

FIG. 10 illustrates the NACK process at step S25 of FIG. 9.

Referring to FIG. 10, at step S31, the retransmission processing section 26 performs a loss packet process hereinafter described with regard to a packet (loss packet) which has been lost and whose sequence number and timestamp have been supplied from the packet analysis section 22.

At next step S32, the retransmission processing section 26 performs a NACK list updating process hereinafter described. Then, at step S33, the network inputting/outputting section 21 transmits a NACK packet produced in such a manner as hereinafter described to the transmission apparatus 2. Thereafter, the processing returns to the routine of the packet reception process of FIG. 9.

Figure 11:
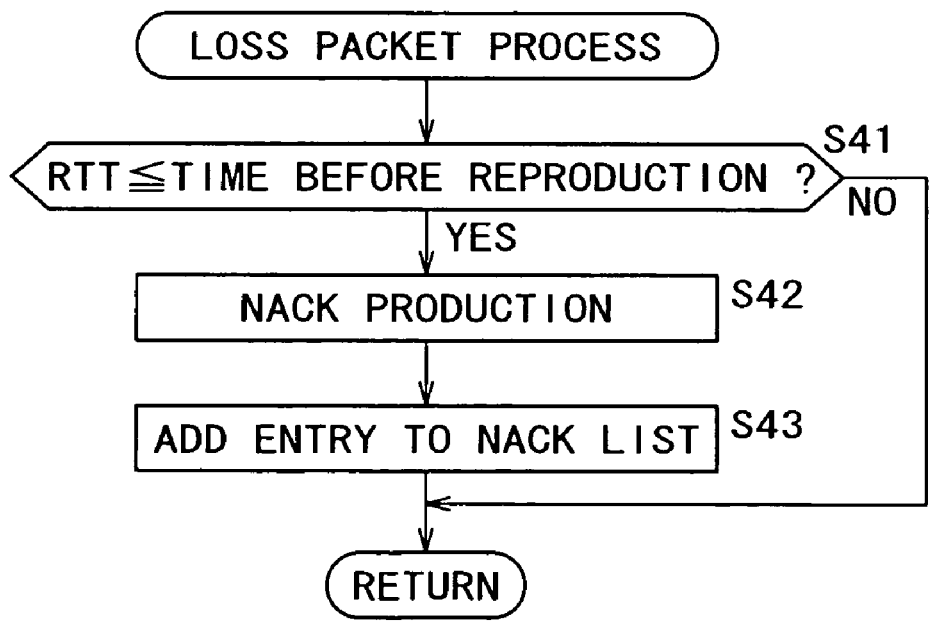
FIG. 11 is a flow chart illustrating a loss packet process at step S31 of FIG. 10.

FIG. 11 illustrates the loss packet process at step S31 of FIG. 10.

Referring to FIG. 11, first at step S41, the retransmission processing section 26 receives the latest round-trip time RTT from the RTT measurement section 25. Further, at step S41, the retransmission processing section 26 subtracts the current time from the reproduction time (reproduction allowance time) of the current loss packet whose sequence number and timestamp have been received from the packet analysis section 22 to calculate a reproduction allowance time period before the reproduction time of the current loss packet. Then, the retransmission processing section 26 discriminates at step S41 whether or not the reproduction allowance time of the current loss packet is equal to or longer than the round-trip time RTT. It is to be noted that the reproduction time of the loss packet can be recognized from the timestamp of the loss packet from the packet analysis section 22.

If it is discriminated at step S41 that the reproduction allowance time of the current loss packet is not equal to or longer than the round-trip time RTT, then the retransmission processing section 26 returns the processing to the original routine of the NACK process of FIG. 10 without performing any process. In particular, in this instance, even if transmission of a NACK packet as a request for retransmission of the current loss packet from the reception apparatus 4 is performed, it is estimated that the reception apparatus 4 receives a retransmission packet corresponding to the loss packet only after the round-trip time RTT elapses and cannot receive the transmission packet in time prior to the reproduction time of the retransmission packet. Therefore, the retransmission processing section 26 does not perform any process regarding the loss packet.

On the other hand, if it is discriminated at step S41 that the reproduction allowance time of the current loss packet is equal to or longer than the round-trip time RTT, then the retransmission processing section 26 supplies the sequence number of the loss packet supplied thereto from the packet analysis section 22 to the NACK production section 28. Thereafter, the processing advances to step S42.

At step S42, the NACK production section 28 produces a NACK packet, in which the sequence number of the current loss packet supplied from the retransmission processing section 26 is described, and supplies the NACK packet to the network inputting/outputting section 21.

At step S43, the retransmission processing section 26 additionally registers the sequence number and the timestamp of the current loss packet supplied thereto from the packet analysis section 22 as packet information of the loss packet into a new entry of the NACK list 27. Thereafter, the processing returns to the original routine of the NACK process of FIG. 10.

Figure 12:
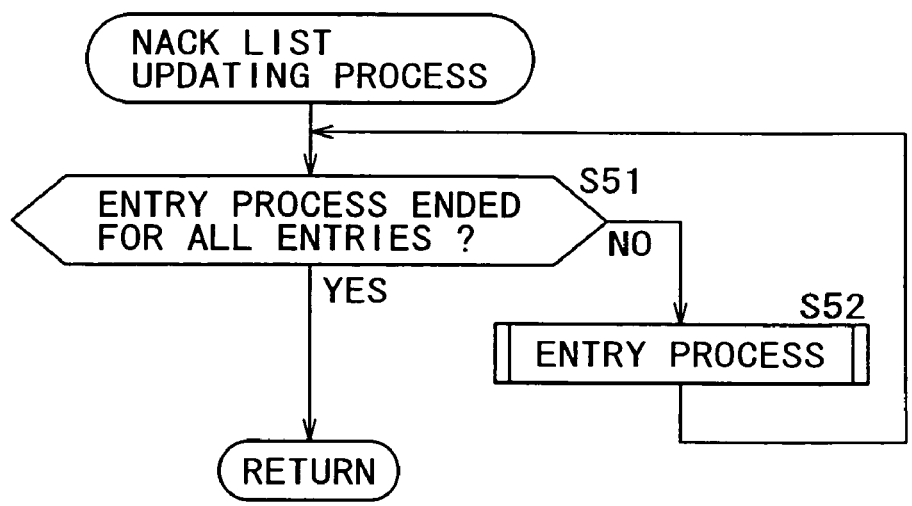
FIG. 12 is a flow chart illustrating a NACK list updating process at step S32 of FIG. 10.

FIG. 12 illustrates the NACK list updating process at step S32 of FIG. 10.

Referring to FIG. 12, the retransmission processing section 26 discriminates at step S51 whether or not an entry process at step S52 described below has been performed for all of the entries of the NACK list 27. If it is discriminated at step S51 that the entry process has not been performed for all entries of the NACK list 27, then the retransmission processing section 26 determines one of those of the entries of the NACK list 27 which have not been made an object of the entry process as yet as a noticed entry. Thereafter, the processing advances to step S52. At step S52, the entry process is performed for the noticed entry of the NACK list 27. The processing thereafter advances to step S51 so that similar processes are repeated.

On the other hand, if it is discriminated at step S51 that the entry process has been performed for all of the entries of the NACK list 27, then the processing returns to the original routine of the NACK process of FIG. 10.

Figure 13:
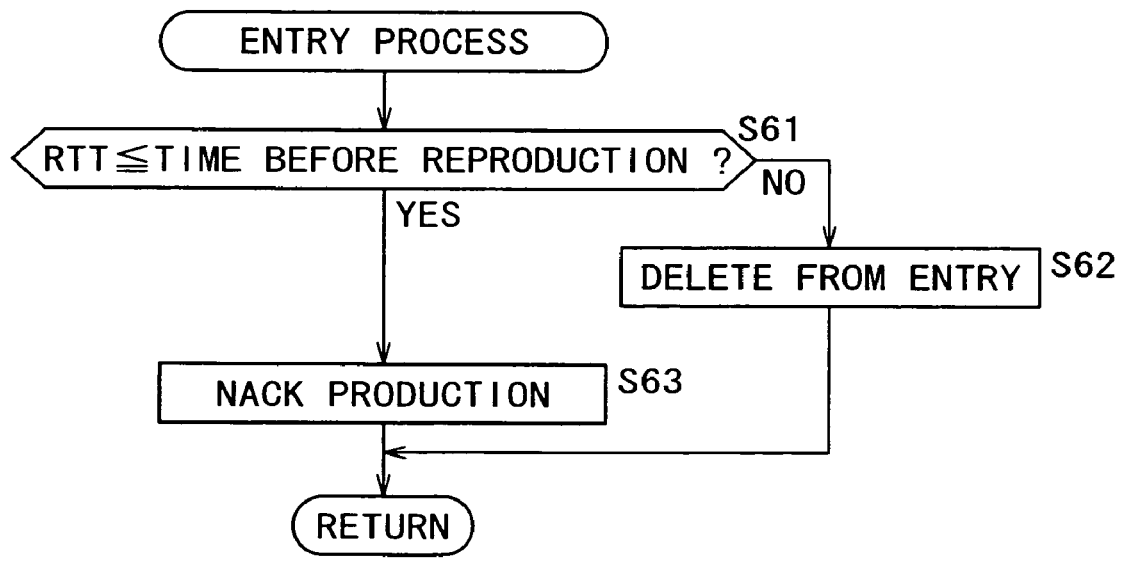
FIG. 13 is a flow chart illustrating an entry process at step S52 of FIG. 12.

FIG. 13 illustrates the entry process at step S52 of FIG. 12.

Referring to FIG. 13, the retransmission processing section 26 receives, at step S61, the latest round-trip time RTT from the RTT measurement section 25 similarly as at step S41 of FIG. 11. Further, the retransmission processing section 26 recognizes, from the timestamp of the packet information of the noticed entry, the reproduction time of the non-arriving packet corresponding to the noticed entry (a non-arriving packet whose packet information is registered in the noticed entry). Then, the retransmission processing section 26 calculates a reproduction allowance time interval of the non-arriving packet corresponding to the noticed entry in a similar manner as in the case at step S41 of FIG. 11.

Further, at step S61, the retransmission processing section 26 discriminates whether or not the reproduction allowance time interval of the non-arriving packet corresponding to the noticed entry is equal to or longer than the round-trip time RTT supplied thereto from the RTT measurement section 25. If it is discriminated at step S61 that the reproduction allowance time interval of the non-arriving packet corresponding to the noticed entry is not equal to or longer than the round-trip time RTT, that is, in case, even if a request for retransmission of the non-arriving packet corresponding to the noticed entry is issued, the retransmission packet does not arrive in time prior to the reproduction time, the processing advances to step S62. At step S62, the retransmission processing section 26 erases the noticed entry from the NACK list 27. Thereafter, the processing returns to the original routine of the NACK list updating process of FIG. 12.

On the other hand, if it is discriminated at step S61 that the reproduction allowance time interval of the non-arriving packet corresponding to the noticed entry is equal to or longer than the round-trip time RTT, then the retransmission processing section 26 reads out the sequence number of the non-arriving packet from the NACK list 27 and supplies the sequence number to the NACK production section 28. Thereafter, the processing advances to step S63.

At step S63, the NACK production section 28 produces a NACK packet, in which the sequence number of the non-arriving packet supplied from the retransmission processing section 26 is described, and supplies the NACK packet to the network inputting/outputting section 21. Thereafter, the processing returns to the NACK list updating process of FIG. 12.

It is to be noted that, at step S42 of FIG. 11 and step S63 of FIG. 13, individual NACK packets may be produced or a single NACK packet in which all of sequence numbers to be placed in the individual NACK packets are placed may be produced.

As described above, packet information of a loss packet is registered into the NACK list 27, and when packet loss is detected, a NACK packet for requesting for retransmission of the non-arriving packet whose packet information is registered in the NACK list 27 is produced and transmitted. Therefore, a NACK packet can be transmitted by a simple process which does not require a timer for each NACK packet, and besides, the number of times by which a NACK packet is to be transmitted can be changed adaptively in response to the (change in) frequency of packet loss and the packet loss can be recovered simply and rapidly. In particular, when the frequency of packet loss is low, wasteful transmission of a NACK packet can be suppressed, and when the frequency of packet loss is high, a NACK packet can be transmitted by a number of times suitable for the frequency of packet loss.

FIG. 14 shows another example of a configuration of the reception apparatus 4 shown in FIG. 1.

Referring to FIG. 14, the reception apparatus 4 shown is a modification to the reception apparatus 4 described hereinabove with reference to FIG. 4 but is different from the reception apparatus 4 only in that it additionally includes a loss interval measurement section 29.

It is to be noted, however, that, when the retransmission processing section 26 receives a sequence number and a timestamp of a loss packet from the packet analysis section 22, then the retransmission processing section 26 supplies packet loss information that packet loss has occurred to the loss interval measurement section 29.

The loss interval measurement section 29 determines, based on the packet loss information from the retransmission processing section 26, a loss interval between the times of occurrences of the preceding packet loss and the current loss and supplies the loss interval to the retransmission processing section 26.

The retransmission processing section 26 determines an upper limit value to the count value for counting the number of times of detection of packet loss from the loss interval from the loss interval measurement section 29 and the round-trip time RTT from the RTT measurement section 25. Further, when a sequence number and a timestamp of a loss packet is supplied from the packet analysis section 22, the retransmission processing section 26 produces packet information of the loss packet in which the sequence number and the timestamp of the loss packet are incremented by the count value, and additionally registers the produced sequence number and timestamp into a new entry of the NACK list 27. Further, when packet loss is detected, the retransmission processing section 26 increments the count value of packet information registered in all entries of the NACK list 27 by one.

Further, the retransmission processing section 26 compares the count value of packet information of non-arriving packets registered in the entries of the NACK list 27 and the upper limit value with each other. Then, the retransmission processing section 26 supplies the sequence number of those non-arriving packets corresponding to the packet information whose count value is higher than the upper limit value to the NACK production section 28, and resets the corresponding count values to zero.

Figures 15, 16:
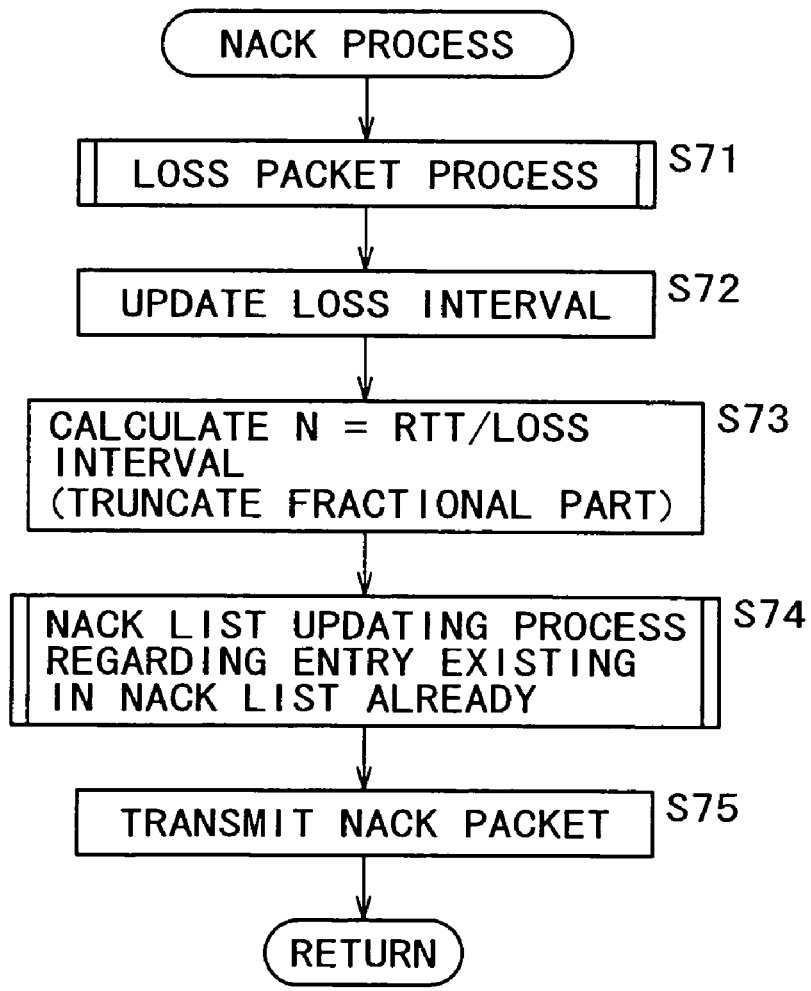
FIG. 15 is a view illustrating entries of a NACK list of FIG. 14.
FIG. 16 is a flow chart illustrating a NACK process of a retransmission processing section shown in FIG. 14 at step S25 of FIG. 9.

FIG. 15 illustrates entries of the NACK list 27 shown in FIG. 14.

As described hereinabove, the retransmission processing section 26 shown in FIG. 14 registers packet information wherein the count value is added to the sequence number and the timestamp of the loss packets into the entries of the NACK list 27. Therefore, in the entries of the NACK list 27 illustrated in FIG. 15, not only the sequence number and the reproduction time of each non-arriving packet are registered similarly as in the NACK list 27 illustrated in FIG. 5, but also the count value is registered.

FIG. 16 illustrates a NACK process (at step S25 of FIG. 9) of the retransmission processing section 26 shown in FIG. 14.

Referring to FIG. 16, the retransmission processing section 26 performs, at step S71, a loss packet process hereinafter described for a loss packet whose sequence number and timestamp are supplied from the packet analysis section 22.

At step S72, the retransmission processing section 26 updates a loss interval stored in a memory (not shown) built therein. In particular, the retransmission processing section 26 acquires the latest loss interval from the loss interval measurement section 29 and updates the loss interval stored in the memory based on the latest loss interval.

In order for the retransmission processing section 26 to update the loss interval at step S72, for example, a method wherein the loss interval stored in the memory is updated with the latest loss interval acquired from the loss interval measurement section 29, another method wherein an exponential weighted moving average (EWMA) is used and so forth are available. According to the method wherein an exponential weighted moving average is used, where the loss interval after updating is represented by $Interval_{new}$, the loss interval currently stored in the memory by $Interval_{prev.}$ and the latest loss interval from the loss interval measurement section 29 by $Interval_{current}$, the loss interval $Interval_{new}$ after updating is calculated in accordance with an expression (1) below:

$$Interval_{new} = (1-\alpha) \times Interval_{prev.} + \alpha Interval_{current} \quad (1)$$

where the parameter $\alpha$ is an adjustment parameter having a value set higher than 0 but lower than 1 ($0<\alpha<1$). As the adjustment parameter $\alpha$ increases, the ratio at which the latest loss interval from the loss interval measurement section 29 is reflected on the loss interval after updating increases. If the loss interval is updated using the exponential weighted moving average, then the loss intervals till now can be averaged.

After the loss interval is adjusted, the retransmission processing section 26 advances the processing from step S72 to step S73.

At step S73, the retransmission processing section 26 determines an upper limit value to the count value from the loss interval after updating calculated at step S72 and the round-trip time RTT supplied from the RTT measurement section 25. Where the upper limit value to the count value is represented by N, the retransmission processing section 26 determines, at step S73, the upper limit value N to the count value in accordance with the following expression (2):

$$N = \left[\frac{RTT}{Interval_{new}}\right] \quad (2)$$

where [X] represents a maximum integer (value of X whose fractional part is truncated) which does not exceed the value X. For example, [0.9] is 0, and [1] is 1 while [1.1] is 1. It is to be noted that the upper limit value N to the count value determined by the expression (2) represents an average in number of times of occurrences of packet loss which occurs within the round-trip time RTT. After the retransmission processing section 26 determines the upper limit value N to the count value in this manner at step S73, the processing advances to step S74.

At step S74, the retransmission processing section 26 performs a NACK list updating process hereinafter described. Then at step S75, the network inputting/outputting section 21 transmits a NACK packet produced in such a manner as hereinafter described at steps S71 and S75 to the transmission apparatus 2. Thereafter, the processing returns to the routine of the NACK process illustrated in FIG. 9.

Figure 17:
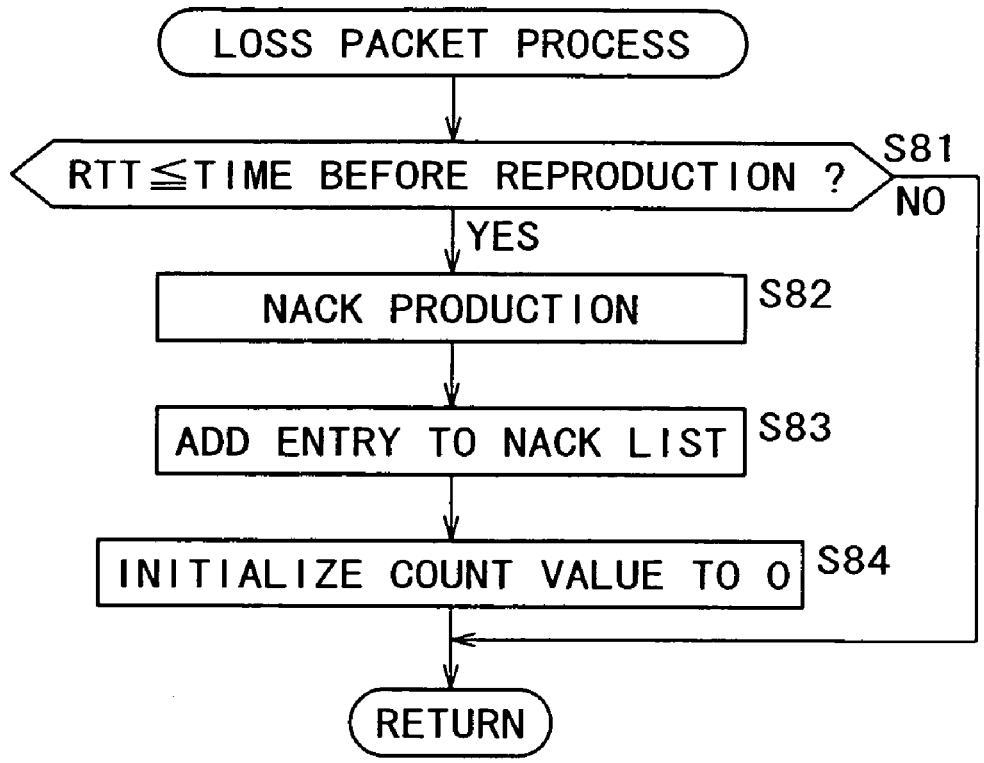
FIG. 17 is a flow chart illustrating a loss packet process at step S71 of FIG. 16.

FIG. 17 illustrates the loss packet process at step S71 of FIG. 16. It is to be noted that the processes at steps S81 to S83 of FIG. 17 are similar to those at steps S41 to S43 of FIG. 11, respectively.

However, at step S83, as packet information of a loss packet, not only the sequence number and the timestamp of the loss packet but also the count value are additionally registered into a new entry of the NACK list 27. Thereafter, the processing advances to step S84.

At step S84, the retransmission processing section 26 initializes (resets) the count value in the packet information of the loss packet registered in the NACK list 27 at step S83 to zero. Thereafter, the processing returns to the routine of the NACK process of FIG. 16.

Figure 18:
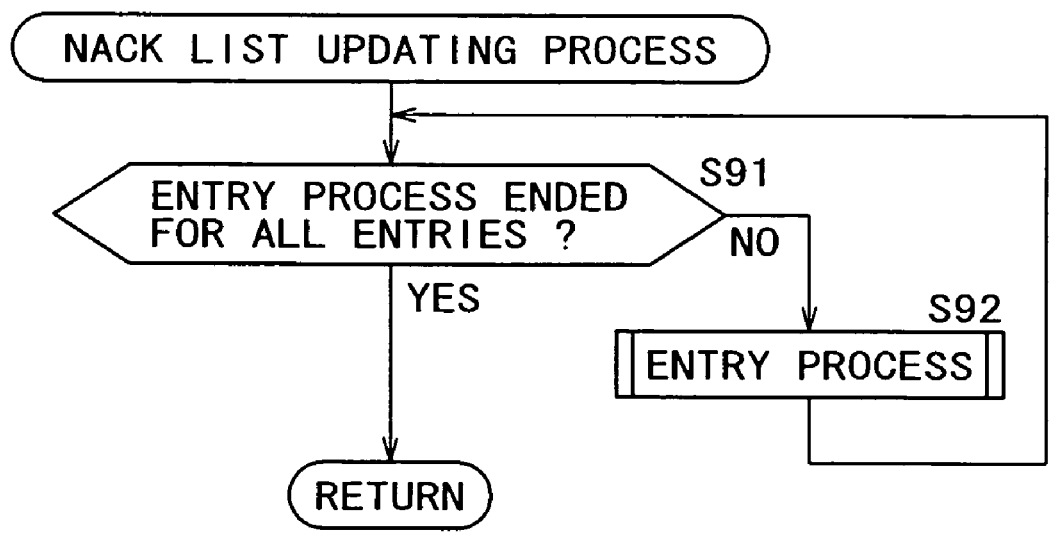
FIG. 18 is a flow chart illustrating a NACK list updating process at step S74 of FIG. 16.

FIG. 18 illustrates the NACK list updating process at step S74 of FIG. 16. It is to be noted that the processes at steps S91 and S92 of FIG. 18 are similar to those at steps S51 and S52 of FIG. 12, respectively.

It is to be noted, however, that the contents of the entry process at step S92 are partly different from the contents of the entry process at step S52 of FIG. 12.

Therefore, the entry process at step S92 of FIG. 18 is described with reference to FIG. 19. It is to be noted that, in the flow chart of FIG. 19, the processes at steps S101 and S102 of FIG. 19 are similar to those at steps S61 and S62 of FIG. 13, and therefore, overlapping description of them is omitted herein to avoid redundancy.

At step S103, the retransmission processing section 26 increments the count value registered in the noticed entry of the NACK list 27 by 1. Thereafter, the processing advances to step S104.

Figure 19:
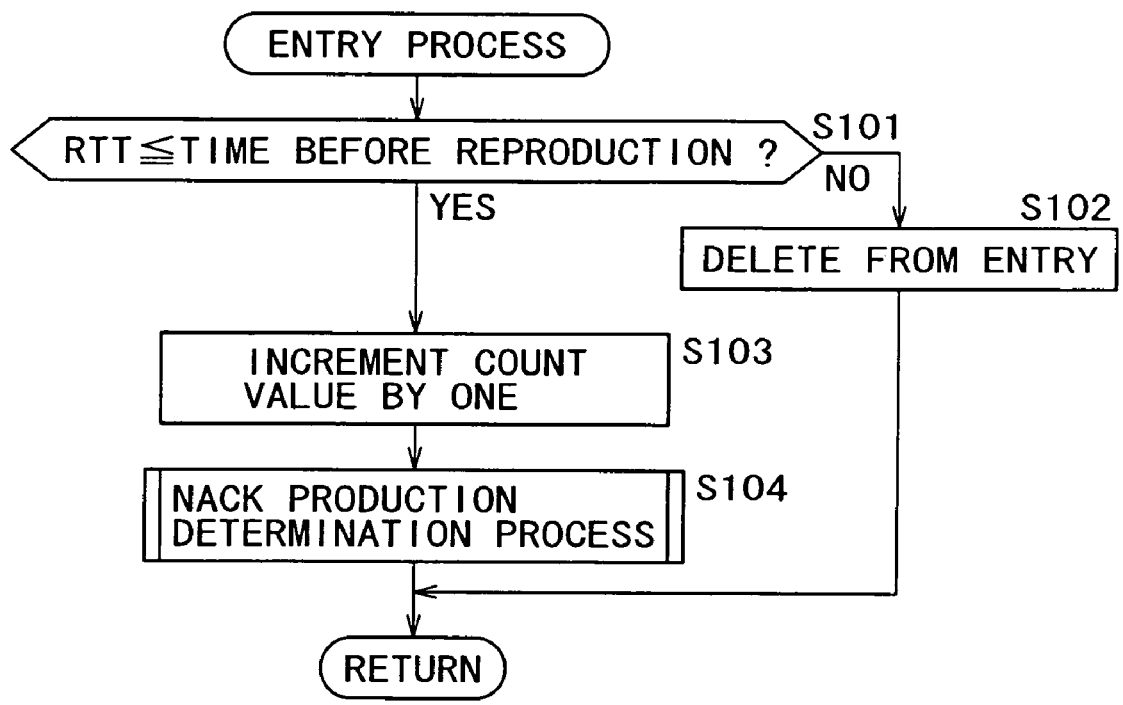
FIG. 19 is a flow chart illustrating an entry process at step S92 of FIG. 18.

The entry process of FIG. 19 is performed when packet loss is detected, and accordingly, the count value registered in the entry of the NACK list 27 is incremented by 1 at step S103 every time packet loss is detected.

At step S104, the retransmission processing section 26 performs a NACK production determination process, whereafter the processing returns to the routine of the NACK list updating process of FIG. 18.

Figure 20:
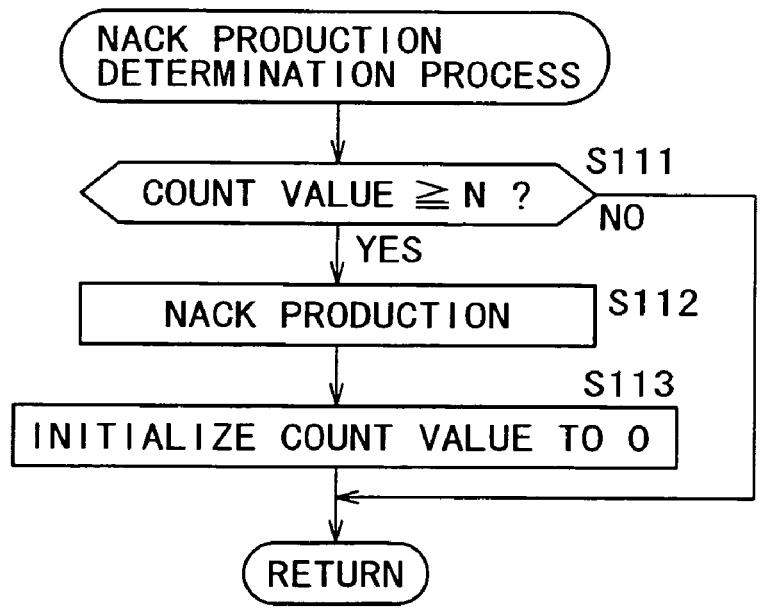
FIG. 20 is a flow chart illustrating a NACK production determination process at step S104 of FIG. 19.

FIG. 20 illustrates the NACK production determination process at step S104 of FIG. 19.

Referring to FIG. 20, the retransmission processing section 26 discriminates, at step S111, whether or not the count value in the packet information registered in the noticed entry is equal to or higher than the upper limit value N to the count value decided at step S73 of FIG. 16. If it is discriminated at step S111 that the count value of the noticed entry is not equal to or higher than the upper limit value N to the count value, then the processing returns to the routine of the entry process of FIG. 19. In other words, if the count value of the noticed entry is not equal to or higher than the upper limit value N to the count value, then a retransmission request for the non-arriving packet corresponding to the noticed entry is not issued.

On the other hand, if it is discriminated at step S111 that the count value of the noticed entry is equal to or higher than the upper limit value N to the count value, then the retransmission processing section 26 supplies the sequence number of the non-arriving packet corresponding to the noticed entry to the NACK production section 28. Then, the processing advances to step S112.

At step S112, the NACK production section 28 produces a NACK packet in which the sequence number of the non-arriving packet supplied thereto from the retransmission processing section 26 is described, and supplies the NACK packet to the network inputting/outputting section 21.

At step S113, the retransmission processing section 26 initializes (resets) the count value of the noticed entry to zero. Thereafter, the processing returns to the routine of the entry process of FIG. 19.

It is to be noted that, at step S82 of FIG. 17 and step S112 of FIG. 20, individual NACK packets may be produced or a single NACK packet in which all of sequence numbers to be placed in the individual NACK packets are placed may be produced.

Variation of the count value and a retransmission request when the upper limit value N to the count value is determined to 2 is described with reference to FIG. 21.

In FIG. 21, three times of packet loss, that is, packet losses $L_0$, $L_1$ and $L_2$, are detected within the round-trip time RTT by the reception apparatus 4. If it is assumed now that the loss intervals between the packet losses $L_0$ and $L_1$ and between the packet losses $L_1$ and $L_2$ are equal to each other for the simplified description, then the upper limit value N to the count value is determined to be 2 from the expression (2) given hereinabove.

When the packet loss $L_0$ occurs, the reception apparatus 4 initializes the count value of (packet information of) the non-arriving packet $P_0$ corresponding to the packet loss $L_0$ (at step S84 of FIG. 17). Further, the reception apparatus 4 produces a NACK packet as a reproduction request for the non-arriving packet $P_0$ (at step S82 of FIG. 17) and transmits the NACK packet to the transmission apparatus 2.

Then, when the packet loss $L_1$ occurs, the reception apparatus 4 initializes the count value of the non-arriving packet $P_1$ corresponding to the packet loss $L_1$ to zero (at step S84 of FIG. 17). Further, the reception apparatus 4 increments the count value 0 of the non-arriving packet $P_0$ registered in the NACK list 27 by one and hence to 1 (at step S103 of FIG. 19). Further, the reception apparatus 4 produces a NACK packet as a retransmission request for the non-arriving packet $P_1$ (at step S82 of FIG. 17) and transmits the NACK packet to the transmission apparatus 2. It is to be noted that, in the case just described, since the count value 1 of the non-arriving packet $P_0$<upper limit value 2 to the count value, a retransmission request regarding the non-arriving packet $P_0$ is not issued.

Thereafter, when the packet loss $L_2$ occurs, the reception apparatus 4 initializes the count value of the non-arriving packet $P_2$ corresponding to the packet loss $L_2$ to zero (at step S84 of FIG. 17). Then, the reception apparatus 4 increments the count values of the non-arriving packets $P_0$ and $P_1$ individually by 1 (at step S103 of FIG. 19). As a result, the count value of the non-arriving packet $P_0$ becomes equal to the upper limit value 2 to the count value while the count value of the non-arriving packet $P_1$ changes to 1. Accordingly, when the packet loss $L_2$ occurs, the reception apparatus 4 produces a NACK packet as a retransmission request corresponding to the non-arriving packet $P_2$ (at step S82 of FIG. 17) and produces a NACK packet as a retransmission request corresponding to the non-arriving packet $P_0$ (at step S112 of FIG. 20). Then, the reception apparatus 4 sends the thus produced NACK packets to the transmission apparatus 2. It is to be noted that, in the present case, since the count value 1 of the non-arriving packet $P_1$<upper limit value 2 to the count value, a transmission request corresponding to the non-arriving packet $P_1$ is not issued.

Further, in response to the issuance of the retransmission request regarding the non-arriving packet $P_0$, the reception apparatus 4 initializes the count value of the non-arriving packet $P_0$ to zero (at step S113 of FIG. 20).

Now, another loss interval measurement method of the loss interval measurement section 29 shown in FIG. 14 is described with reference to FIG. 22.

The loss interval measurement section 29 of FIG. 14 determines a loss interval time through actual measurement. The loss interval measurement section 29 can determine a loss interval time also from a loss rate (loss probability) representative of a ratio at which packets transmitted from the transmission apparatus 2 suffer from packet loss on the packet switched network 3 and so forth and become non-arriving packets at the reception apparatus 4 and the stream band (transmission band used for transmission of packets on the packet switched network 3).

Where the loss probability is represented by r [%], the loss interval by T [s] and the number of packets transmitted per 1 second by N ([packets/s]), the relationship between the loss rate r and the loss interval T is represented by the following expression (3):

$$\frac{1}{T} = N\left(\frac{r}{100}\right) \quad (3)$$

Further, where the average size of packets produced by the packet production section 12 of FIG. 2 is represented by P [kB], the relationship between the number N of packets transmitted per one second and the used band B [Mbps] of the stream is represented by the following expression (4):

$$N \times P \times \frac{8}{1024} = B \quad (4)$$

The following expression (5) is obtained by transformation of the expression (4):

$$N = B \times \frac{128}{P} \quad (5)$$

The following expression (6) can be derived from the two relational expressions of the expression (3) and the expression (5):

$$T = \frac{1}{N\left(\frac{r}{100}\right)} = \frac{100 \times P}{128 \times B \times r} \quad (6)$$

Generally, the average packet size of packets transmitted on the Internet is approximately 1 [kB]. Therefore, if the relationship between the loss rate r and the loss interval T is calculated in accordance with the expression (6) above assuming that the average size P of packets produced by the packet production section 12 is 1, then such a graph as shown in FIG. 22 is obtained.

In FIG. 22, the axis of abscissa represents the loss rate (loss probability) r and the axis of ordinate represents the loss interval (loss interval time) T.

The loss interval T decreases as the size of the stream band B with respect to the same loss rate r increases. The loss interval measurement section 29 can determine the loss rate r and then determine the loss interval T from the determined loss rate r using the graph of FIG. 22.

As described above, when packet loss occurs, the count value for a non-arriving packet registered in the NACK list 27 is incremented by one, and when the resulting count value is equal to or higher than the upper limit value N determined from the loss interval and the round-trip time RTT, a retransmission request regarding the non-arriving packet corresponding to the count value is issued.

Accordingly, where the loss interval is sufficiently shorter than the round-trip time RTT, such a situation that a plurality of NACK packets regarding the same loss packet are transmitted successively in such a manner that, after a first NACK loss packet regarding a certain loss packet is transmitted, a second NACK packet is transmitted immediately can be prevented. In other words, where the loss interval is short and accordingly the loss rate r is high, useless transmission of a NACK packet can be prevented. As a result, increase of the traffic on the packet switched network 3 can be suppressed.

On the other hand, where the loss interval is sufficiently longer than the round-trip time RTT, that is, where the loss rate r is low, the transmission frequency of a NACK packet becomes high. As a result, a retransmission packet can be obtained rapidly.

While the series of processes described above can be executed by hardware, it may otherwise be executed by software.

Where the series of processes described above are executed by software, for example, the transmission apparatus 2 and the reception apparatus 4 can be formed from, for example, such a computer as shown in FIG. 23.

Referring to FIG. 23, a central processing unit (CPU) 41 executes various processes in accordance with a program stored in a ROM (Read Only Memory) 42 or a program loaded from a storage section 48 into a RAM (Random Access Memory) 43.

Also data necessary for the CPU 41 to execute the processes are suitably stored into the RAM 43.

The CPU 41, ROM 42 and RAM 43 are connected to one another by a bus 44. Also an input/output interface 45 is connected to the bus 44.

An inputting section 46 including a keyboard, a mouse and so forth, an outputting section 47 including a display unit and so forth, a storage section 48 formed from a hard disk or the like, a communication section 49 and so forth are connected to the input/output interface 45.

Further, as occasion demands, a drive 50 is connected to the input/output interface 45. A magnetic disk 51, an optical disk 52, a magneto-optical disk 53, a semiconductor memory 54 or the like is suitably loaded into the drive 50, and a computer program read from the loaded medium is installed into the storage section 48 as occasion demands.

Where the series of processes is executed by software, a program which constructs the software is installed from a program storage medium into a computer incorporated in hardware for exclusive use or, for example, a personal computer for universal use which can execute various functions by installing various programs.

The program storage medium for storing the program which is installed into and can be executed by a computer is formed as a package medium such as, as shown in FIG. 23, a magnetic disc 51 (including a floppy disc), an optical disc 52 (including a CD-ROM (Compact Disc-Read Only Memory) and a DVD (Digital Versatile Disc)), a magneto-optical disc 53 (including an MD (Mini Disc)) (registered trademark), a semiconductor memory 54 or the like or a ROM 42 or a hard disk of a component of the storage section 48 in which the program is stored temporarily or permanently. Storage of the program into the program storage medium is performed utilizing a wired or wireless communication medium such as a local area network, the Internet or digital satellite broadcasting through an interface such as a router or a modem as occasion demands.

It is to be noted that, in the present specification, the steps which describe the program recorded on a program storage medium may be but need not necessarily be processed in a time series in the order as described, and include processes which are executed in parallel or individually without being processed in a time series.

Further, in the present specification, the term "system" is used to represent an entire apparatus composed of a plurality of apparatus.

It is to be noted that, while, in the embodiment described above, the Internet is adopted as the packet switched network 3, it is not limited to this, but any other wired or wireless communication circuit can be adopted.

Further, the outputting apparatus 1 may include, in addition to a video camera described hereinabove, a microphone, a radio cassette recorder having a radio broadcast receiving function, a CD (Compact Disc) player, an MD player and so forth. Furthermore, the data to be transmitted from the transmission apparatus 2 to the reception apparatus 4 may be audio data.

Further, in the embodiment described above, the RTP packet illustrated in FIG. 4 which is used in the RTP which is a standard protocol is adopted as a packet to be produced by the packet production section 12 in order to assure the mutual connectability to other apparatus. However, the packet to be produced by the packet production section 12 is not limited to this, but any other packet can be used only if it includes a sequence number and a timestamp (or information corresponding to them).

Furthermore, while, in the embodiments described above, transmission of a NACK packet is controlled in response to the loss interval and the round-trip time RTT by the reception apparatus 4 of FIG. 14, it may be controlled in a different manner. For example, when packet loss occurs, the reception apparatus 4 transmits NACK packets regarding all non-arriving packets to the transmission apparatus 2. The transmission apparatus 2 thus measures the interval over which it successively receives the NACK packets transmitted from the reception apparatus 4 as a loss interval, and thus controls transmission of a retransmission packet in response to the measured loss interval and the round-trip time RTT.

What is claimed is:

1. A reception apparatus for receiving packets successively transmitted from a transmission apparatus, comprising:
    a detection unit configured to detect loss of a packet;
    a registration unit configured to register packet information including identification information for identification of the packet with which the loss occurs into a retransmission request list;
    a retransmission requesting packet production unit configured to produce, when loss of a packet is detected by said detection unit, a retransmission requesting packet for requesting retransmission of the non-arriving packet whose packet information is registered in said retransmission request list;
    a retransmission requesting packet transmission unit configured to transmit the retransmission requesting packet to said transmission apparatus;

a deletion unit configured to delete the packet information of the non-arriving packet which does not arrive in time prior to the reproduction time from said retransmission request list, wherein the packet information further includes a count value for counting a number of times by which loss of the packet is detected by said detection unit, and said retransmission requesting packet production unit produces the retransmission requesting packet for those of the non-arriving packets having the packet information registered in said retransmission request list which have the count values not less than a threshold value; and a setting unit configured to set the threshold value based on a calculated loss interval, which is an interval of time between two consecutively lost packets.

2. A reception apparatus according to claim 1, further comprising:

a round-trip time measurement unit configured to measure round-trip time which is an interval of time after a retransmission requesting packet is transmitted to said transmission apparatus until a retransmission packet corresponding to a packet whose retransmission is requested by the retransmission requesting packet arrives from said transmission apparatus at said reception apparatus; and a reproduction discrimination unit configured to compare a reproduction allowance time period which is a period of time of allowance before reproduction of the non-arriving packet is to be performed and the round-trip time with each other to discriminate whether or not the retransmission packet corresponding to the non-arriving packet arrives in time prior to the reproduction time of the retransmission packet.

3. A reception apparatus according to claim 1, further comprising:

a retransmission packet reception unit configured to receive a retransmission packet transmitted from said transmission apparatus and corresponding to the packet whose retransmission is requested by the retransmission requesting packet; and said deletion unit configured to delete the packet information of the non-arriving packet corresponding to the retransmission packet received by said retransmission packet reception unit from said retransmission request list.

4. A reception apparatus according to claim 1, wherein said retransmission requesting packet production unit produces the retransmission requesting packet for all of the non-arriving packets whose packet information is registered in said retransmission request list.

5. A reception apparatus according to claim 1, further comprising:

a round-trip time measurement unit configured to measure the round-trip time which is an interval of time after a retransmission requesting packet is transmitted to said transmission apparatus until a retransmission packet corresponding to the packet whose retransmission is requested by the retransmission requesting packet arrives from said transmission apparatus at said reception apparatus.

6. A reception apparatus according to claim 1, further comprising:

a resetting unit configured to reset the count regarding the non-arriving packet whose retransmission is requested by the retransmission requesting packet.

7. A reception method for receiving packets successively transmitted from a transmission apparatus, comprising:

detecting loss of a packet;

registering packet information including identification information for identification of the packet with which the loss occurs into a retransmission request list;

producing, when loss of a packet is detected by the detecting, a retransmission requesting packet for requesting for retransmission of the non-arriving packet whose packet information is registered in the retransmission request list;

transmitting the retransmission requesting packet to said transmission apparatus;

deleting the packet information of the non-arriving packet which does not arrive in time prior to the reproduction time from said retransmission request list, wherein the packet information further includes a count value for counting a number of times by which loss of the packet is detected, and producing the retransmission requesting packet for those of the non-arriving packets having the packet information registered in said retransmission request list which have the count values not less than a threshold value; and setting the threshold value based on a calculated loss interval, which is an interval of the time between two consecutively lost packets.

8. A non-transitory computer-readable storage medium storing a program for allowing a computer to execute a reception process for receiving packets successively transmitted from a transmission apparatus, the program comprising:

detecting loss of a packet;

registering packet information including identification information for identification of the packet with which the loss occurs into a retransmission request list;

producing, when loss of a packet is detected by the detecting, a retransmission requesting packet for requesting for retransmission of the non-arriving packet whose packet information is registered in the retransmission request list;

transmitting the retransmission requesting packet to said transmission apparatus;

deleting the packet information of the non-arriving packet which does not arrive in time prior to the reproduction time from said retransmission request list, wherein the packet information further includes a count value for counting a number of times by which loss of the packet is detected, and producing the retransmission requesting packet for those of the non-arriving packets having the packet information registered in said retransmission request list which have the count values not less than a threshold value; and setting the threshold value based on a calculated loss interval, which is an interval of the time between two consecutively lost packets.

9. A reception apparatus according to claim 1, wherein said registration unit is further configured to register a sequence number and a timestamp of said packet in which loss is detected.

10. A reception apparatus according to claim 1, wherein said setting unit sets said threshold value based on said calculated loss interval and said measured round-trip time.

* * * * *